(12) United States Patent
Solli et al.

(10) Patent No.: US 8,873,132 B2
(45) Date of Patent: Oct. 28, 2014

(54) METHOD AND APPARATUS FOR GENERATION AND DETECTION OF ROGUE WAVES

(71) Applicant: The Regents of the University of California, Oakland, CA (US)

(72) Inventors: Daniel R. Solli, Oakland, CA (US); Bahram Jalali, Los Angeles, CA (US); Claus Ropers, Gottingen (DE)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/693,896

(22) Filed: Dec. 4, 2012

(65) Prior Publication Data

US 2013/0163071 A1     Jun. 27, 2013

Related U.S. Application Data

(63) Continuation of application No. 12/780,438, filed on May 14, 2010, now Pat. No. 8,355,198, which is a continuation of application No. PCT/US2008/085041, filed on Nov. 26, 2008.

(60) Provisional application No. 60/990,582, filed on Nov. 27, 2007.

(51) Int. Cl.
*H01S 3/06* (2006.01)

(52) U.S. Cl.
USPC ........................................ 359/333; 359/341.1

(58) Field of Classification Search
USPC ............................................... 359/333, 341.1
See application file for complete search history.

(56) References Cited

U.S. PATENT DOCUMENTS

| 5,015,054 | A | 5/1991 | Chaffee |
| 5,136,599 | A * | 8/1992 | Wilcox ........................... 372/26 |
| 6,813,429 | B2 | 11/2004 | Price et al. |
| 6,856,737 | B1 | 2/2005 | Parker et al. |
| 2005/0117841 | A1 | 6/2005 | Braun et al. |
| 2005/0226289 | A1 | 10/2005 | Goto et al. |
| 2006/0225383 | A1 | 10/2006 | Cobb et al. |
| 2007/0091941 | A1 | 4/2007 | Mori et al. |
| 2008/0225383 | A1 | 9/2008 | Theberge et al. |
| 2011/0032605 | A1 | 2/2011 | Kliner et al. |
| 2011/0122644 | A1 | 5/2011 | Okuno |

OTHER PUBLICATIONS

Dudley, J.M. et al.—"Supercontinuum generation in photonic crystal fiber"—Reviews of Modern Physics, vol. 78, Oct.-Dec. 2006, pp. 1135-1184.

Kharif, C. et al.—"Physical Mechanisms of the Rogue Wave Phenomenon"—Eur. J. Mech. B/Fluids, vol. 22, 2003, pp. 1-49.

Walker, D.A.G. et al.—"The shape of large surface waves on the open sea and the Draupner New Year wave"—App. Ocean, Res. 26, 2004, pp. 1-39.

(Continued)

*Primary Examiner* — Mark Hellner
(74) *Attorney, Agent, or Firm* — John P. O'Banion

(57) ABSTRACT

Methods and systems are provided for generation and detection of rogue waves, including hydrodynamic rogue waves and optical rogue waves. A method for generating an optical rogue wave comprises the steps of generating an input pulse into a nonlinear optical medium, and perturbing the input pulse by directing a narrow-band seed radiation into the input pulse. The seed radiation has a frequency and timing to generate broadband radiation within the nonlinear optical medium.

28 Claims, 16 Drawing Sheets

(56) References Cited

OTHER PUBLICATIONS

Dysthe, K. et al.—""Freak" waves and large-scale simulations of surface gravity waves"—Rogue Waves, Proc. of the 14th Aha Huliko'a Hawaiian Winter Workshop, 2005, pp. 91-99.

White, B.S. et al.—"On the chance of freak waves at sea"—J. Fluid Mech., vol. 355, 1998, pp. 113-138.

Segur, H. et al.—"Stabilizing the Benjamin-Feir instability"—J. Fluid Mech., vol. 539, 2005, pp. 229-271.

Han, Y. et al.—"Tera-sample-per-second Real-time Waveform Digitizer"—Appl. Phys. Letter, vol. 87, 2005, pp. 1-12.

Gu, X. et al.—"Frequency-resolved optical gating and single-shot spectral measurements reveal fine structure in microstructure-fiber continuum"—Optics Letters, vol. 27, No. 13, Jul. 1, 2002, pp. 1174-1176.

Boyraz, O. et al.—"10 Gb/s Multiple Wavelength, Coherent Short Pulse Source Based on Spectral Carving of Supercontinuum Generated in Fibers"—J. of Lightwave Technology, vol. 18, No. 12, Dec. 2000, pp. 2167-2175.

Hopkin, M.—"Sea snapshots will map frequency of freak waves"—Nature, vol. 430, Jul. 29, 2004, 1 page.

Perkins, S.—"Dashing rogues: freak ocean waves pose threat to ships, deep-sea oil platforms"—Science News Online, 170, 2006, 5 pages.

Broad, W.J.—"Rogue Giants at Sea"—The New York Times, Jul. 11, 2006, pp. 1-5.

Hermann, J. et al.—"Experimental Evidence for Supercontinuum Generatino by Fission of Higher-Order Solitons in Photonic Fibers"—Physical Review Letters, vol. 88, 2002, pp. 1-4.

Corwin, K.L. et al.—"Fundamental Noise Limitations to Supercontinuum Generation in Microstructure Fibers"—Physical Review Letters, vol. 90, No. 11, Mar. 2003, pp. 113904-1-113904-4.

Gaeta, A.L.—"Nonlinear propagation and continuum generation in microstructured optical fibers"—Optics Letters, vol. 27, No. 11, Jun. 1, 2002, pp. 924-926.

Alfano, R.R. et al.—"The Ultimate White Light"—Scientific American, Dec. 2006, pp. 87-93.

Muller, P. et al.—"Rogue Waves"—Meeting Report on the Fourteenth 'Aha Huliko'a Hawaiian Winter Workshop, Oceanography, vol. 18, No. 3, Sep. 2005, pp. 66-75.

Liu, P.C. et al.—"Are there different kinds of rogue waves?"—25th Int. Conf. on Offshore Mechanics and Arctic Engineering, Hamburg, Germany, Jun. 4-9, 2006, pp. 1-6.

Henderson, K.L. et al.—"Unsteady water wave modulations: fully nonlinear solutions and comparison with the nonlinear Schroedinger equation"—Wave Motion, vol. 29, 1999, pp. 341-361.

Onorato, M. et al.—"Freak Waves in Random Oceanic Sea States"—Physical Review Letters, vol. 86, No. 25, Jun. 18, 2001, pp. 5831-5834.

Onorato, M. et al.—Modulational Instability in Crossing Sea States: A Possible Mechanism for the Formation of Freak Waves'—Physical Review Letters, vol. 96, Jan. 2006, pp. 014503-1-014503-4.

Shukla, P.K. et al.—"Instability and Evolution on Nonlinearity Interacting Water Waves"—Physical Review Letters, vol. 97, Sep. 2006, pp. 094501-1-094501-4.

Janssen, P.—"Nonlinear four-wave interaction and freak waves"—Jour. Phys. Oceanography, vol. 33, 2003, pp. 863-884.

Ranka, J.K. et al.—"Visble continuum generation in air-silica microstructure optical fibers with anomalous dispersion at 800 nm"—Optics Letters, vol. 25, No. 1, Jan. 1, 2000, pp. 25-27.

Islam, M.N. et al.—"Femtosecond distributed soliton spectrum in fibers"—J. Opt. Soc. Am. B, vol. 6, No. 6, Jun. 1989, pp. 1149-1158.

Kutz, J.N. et al.—"Enhanced Supercontinuum Generation through Dispersion-Management"—Optics Express, vol. 13, No. 11, May 30, 2005, pp. 3989-3998.

Nakazawa, M. et al.—"Random evolution and coherence degradation of a high-order optical soliton train in the presence of noise"—Optics Letters, vol. 24, No. 5, Mar. 1, 1999, pp. 318-320.

Trulsen, K. et al.—"A modified nonlinear Schrodinger equation for broader bandwidth gravity waves on deep water"—Wave Motion, vol. 24, 1996, pp. 281-289.

U.S. Patent and Trademark Office, International Search Report and Written Opinion issued on Feb. 4, 2009 for counterpart PCT Application No. PCT/US2008/085041, International Publication No. WO 2009/070768 dated Jun. 4, 2009 (pp. 1-9), with claims searched (pp. 9-17) pp. 1-17.

* cited by examiner

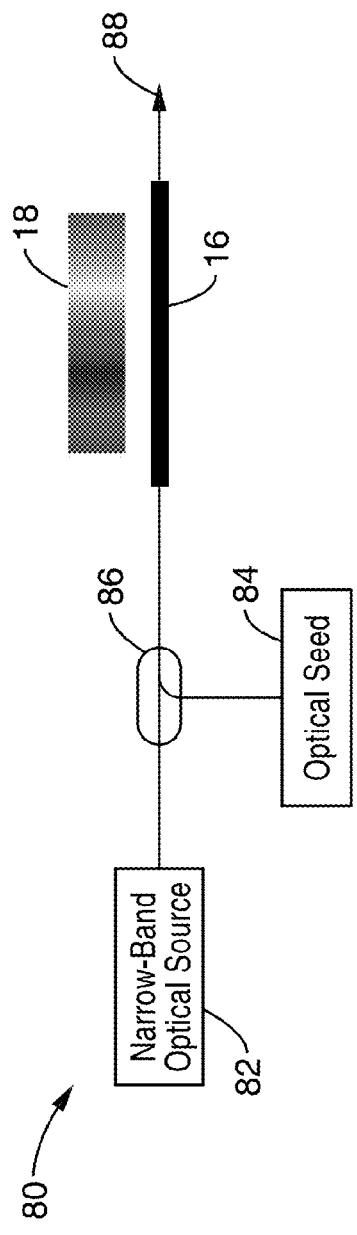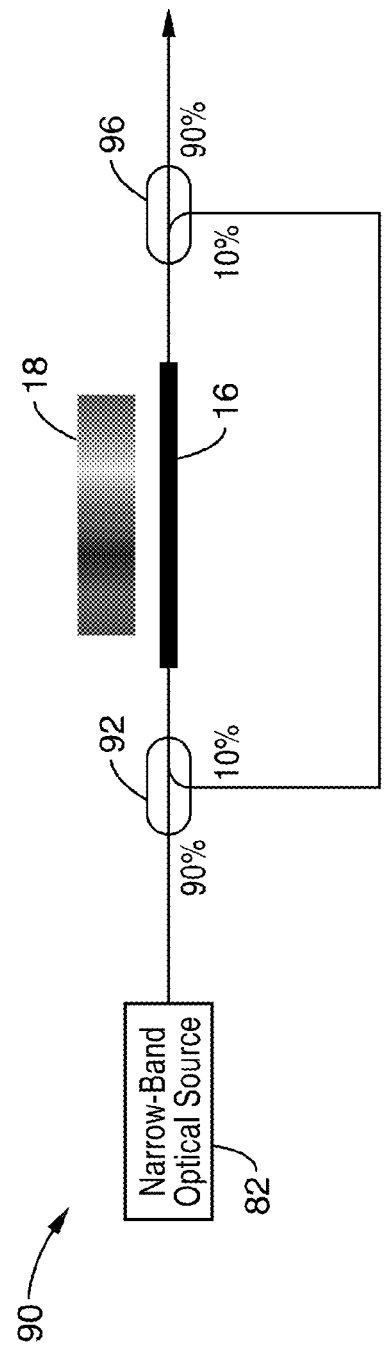

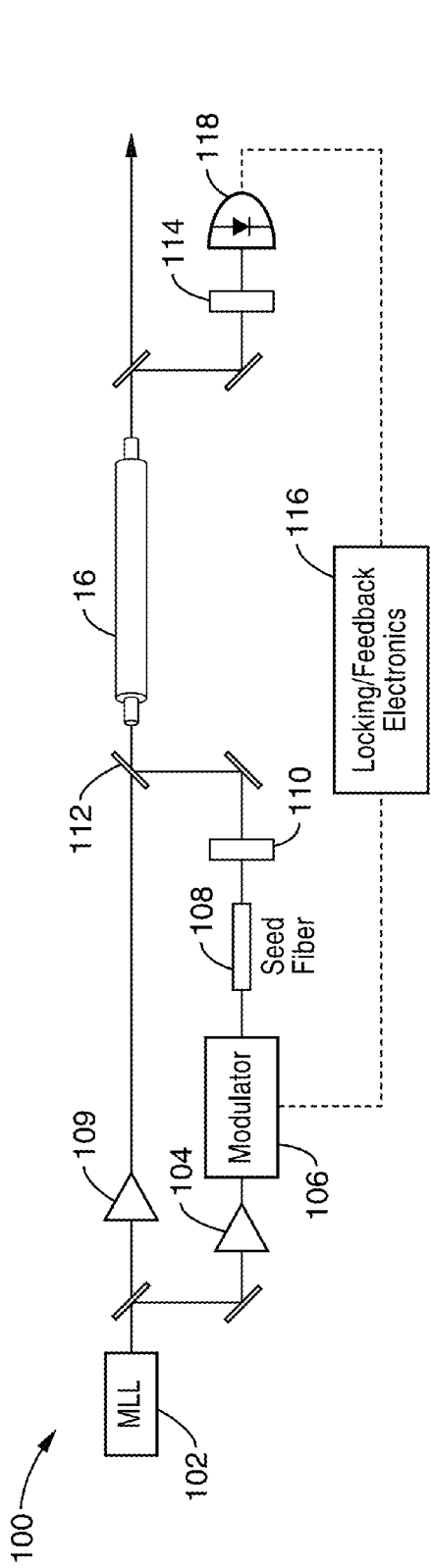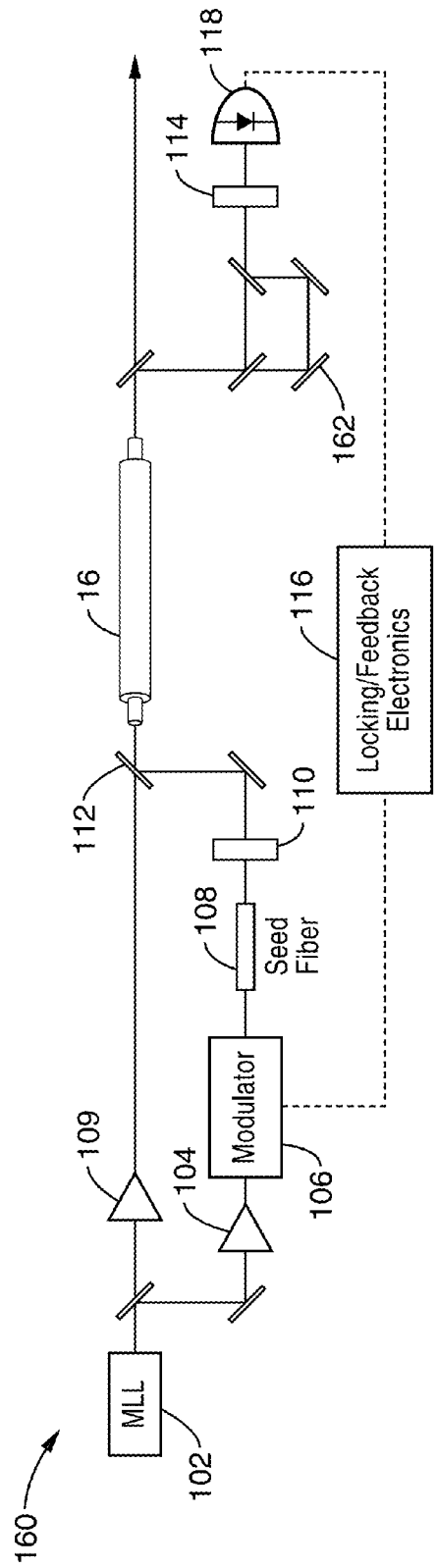
FIG. 13
FIG. 14

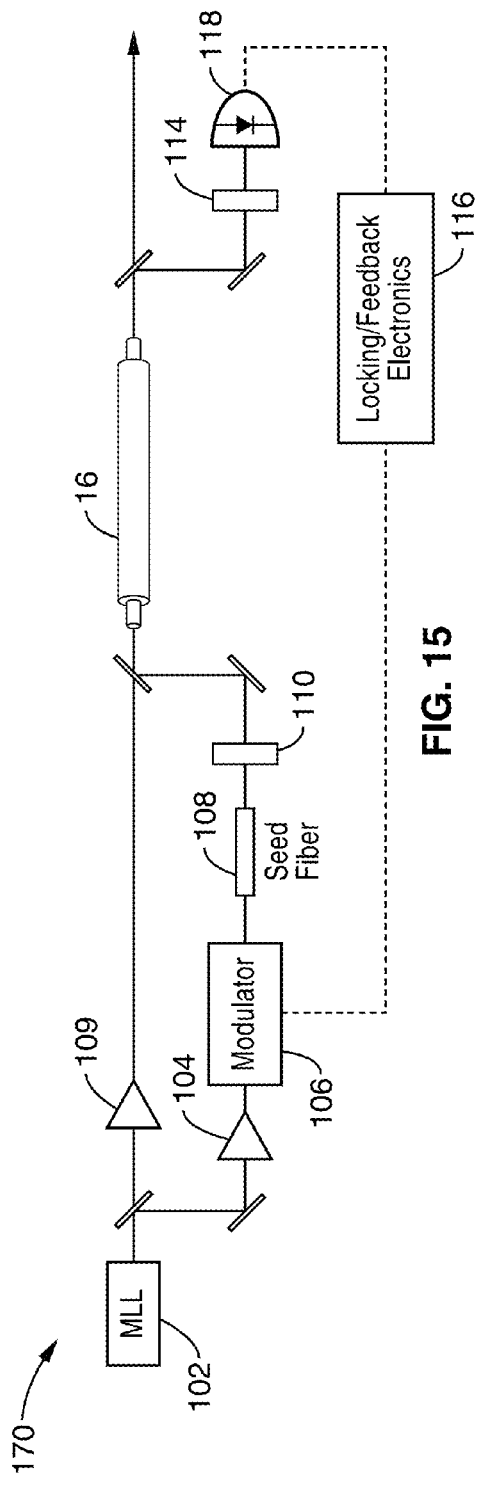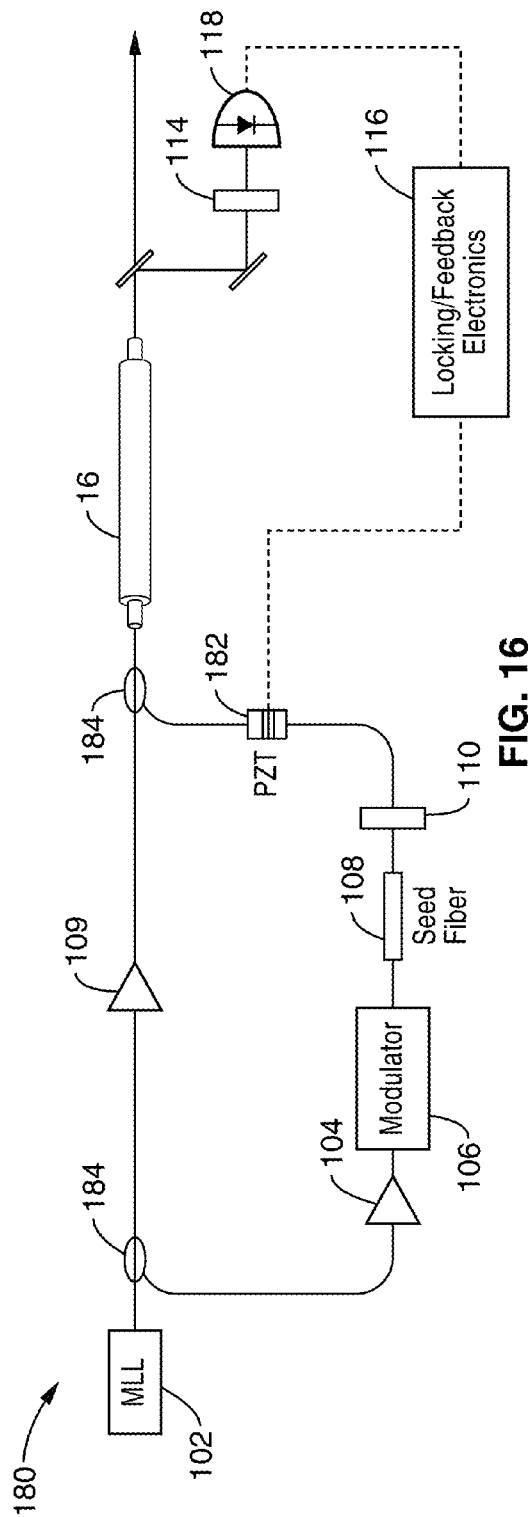

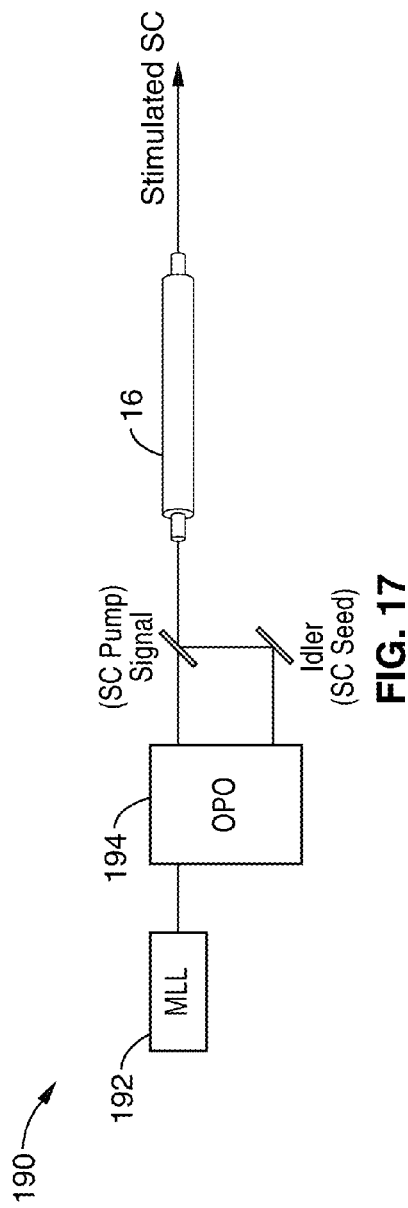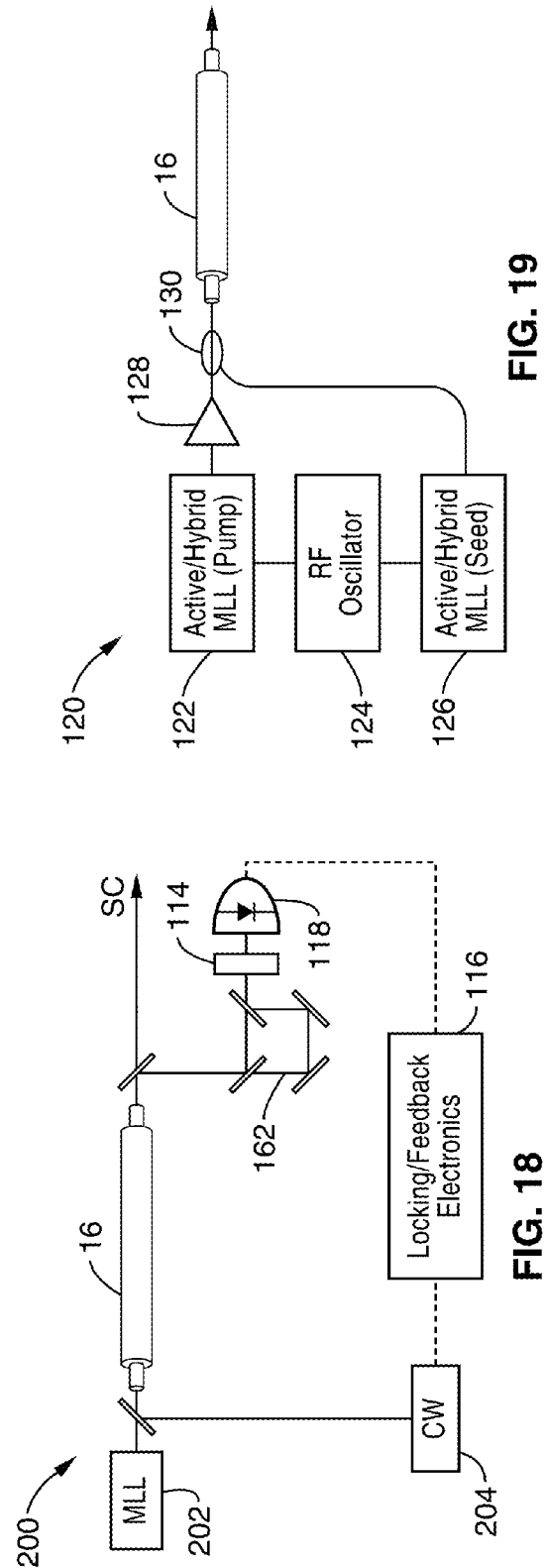

US 8,873,132 B2

METHOD AND APPARATUS FOR GENERATION AND DETECTION OF ROGUE WAVES

CROSS-REFERENCE TO RELATED APPLICATIONS

This application is a continuation of U.S. patent application Ser. No. 12/780,438 filed on May 14, 2010, incorporated herein by reference in its entirety, which is a 35 U.S.C. §111(a) continuation of PCT international application number PCT/US2008/085041 filed on Nov. 26, 2008, incorporated herein by reference in its entirety, which is a nonprovisional of U.S. provisional patent application Ser. No. 60/990,582 filed on Nov. 27, 2007, incorporated herein by reference in its entirety. Priority is claimed to each of the foregoing applications.

The above-referenced PCT international application was published as PCT International Publication No. WO 2009/070768 on Jun. 4, 2009, and is incorporated herein by reference in its entirety. The above-referenced continuation of said PCT international application was published as U.S. Patent Application Publication No. US-2010-0296154-A1 on Nov. 25, 2010, and is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

A portion of the material in this patent document is also subject to protection under the maskwork registration laws of the United States and of other countries. The owner of the maskwork rights has no objection to the facsimile reproduction by anyone of the patent document or the patent disclosure, as it appears in the United States Patent and Trademark Office publicly available file or records, but otherwise reserves all maskwork rights whatsoever. The maskwork owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to generation and detection of specific waveforms, and more particularly to generation and detection of rogue waves in both optical and hydrodynamic applications.

2. Description of Related Art

Until very recently, rogue waves were thought to be the subject of myth or legend, rather than scientific reality. In the mid 1990s, however, freak waves proved very real when recorded for the first time by scientific measurements during an encounter at the Draupner oil platform in the North Sea. Although elusive and intrinsically very difficult to monitor because of their fleeting existences, satellite surveillance has recently confirmed that rogue waves roam the open oceans, occasionally encountering a ship or sea platform, sometimes with devastating results. It is now believed that a number of infamous maritime disasters were caused by encounters with rogue waves.

Recent observations have shown that the probability of encountering an extremely large rogue wave in the open ocean is much larger than expected from ordinary waveamplitude statistics. Although considerable effort has been directed towards understanding the physics behind these mysterious and potentially destructive events, the complete picture remains uncertain. Furthermore, rogue waves have not yet been observed in other physical systems.

The unusual statistics of rogue waves represents one of their defining characteristics. Conventional models of ocean waves indicate that the probability of observing very large waves should diminish extremely rapidly with wave height, suggesting that the likelihood of observing even a single freak wave in hundreds of years should be essentially nonexistent. In reality, however, ocean waves appear to follow "L-shaped" statistics: most waves have small amplitudes, but extreme outliers also occur much more frequently than expected in ordinary (e.g., Gaussian or Rayleigh) wave statistics.

Although the physics behind rogue waves is still under investigation, observations indicate that rogue waves have unusually steep, solitary or tightly-grouped profiles, which appear like "walls of water".

It is likely that more than one process can produce occasional extreme waves with small but non-negligible probability. Possible mechanisms that have been suggested to explain oceanic rogue waves include effects such as nonlinear focusing via modulation instability in one dimension and two-dimensional crossings, nonlinear spectral instability, focusing with caustic currents, and anomalous wind excitation. Nonlinear mechanisms have attracted particular attention because they are known to possess the requisite extreme sensitivity to initial conditions.

Supercontinuum generation has been explored in detail, and numerous commercial products are offered utilizing this concept. However, the concept of optical rogue waves and their connection to supercontinuum generation has not been previously described in the art.

Accordingly, an object of the present invention is a method and system for applying weak probe radiation to stimulate and stabilize the supercontinuum generation process.

Another an object is a method and system for using stimulated supercontinuum generation or optical rogue waves to control a strong optical field with a weak optical field and to apply this concept to optical switching Yet another object of the present invention is a method and system for intentionally creating hydrodynamic rogue waves. A further object is a method for collapsing or destroying extreme water waves through the application of weak perturbations with particular characteristics. An additional object is a method and system to predict the occurrence of rogue waves.

At least some of these objectives will be met in the following description.

BRIEF SUMMARY OF THE INVENTION

The present invention is directed to the predictable generation and detection of rogue waves, in addition to the novel concept of optical rogue waves, a counterpart of the infamous rare water waves. Utilizing the novel real-time detection technique of the present invention, systems and methods are described that exposes extremely steep, large waves as rare outcomes from an almost identically-prepared initial population.

Specifically, the present invention includes the direct, real-time observation of rogue waves in an optical system near the threshold of soliton-fission supercontinuum generation—a noise-sensitive, nonlinear process in which extremely broadband radiation is generated from a narrow-band input. The generation of these rogue waves is modeled using the generalized nonlinear Schrödinger equation, and it is demonstrated that these waveforms arise infrequently from initially smooth pulses due to power transfer seeded by a small noise perturbation.

An extremely broadband supercontinuum source is demonstrated by launching intense seed pulses into a nonlinear fiber at or near its zero-dispersion wavelength (although other wavelengths are also contemplated). In this configuration, supercontinuum production involves generation of high-order solitons—the optical counterparts of solitary water waves—which fission into red-shifted solitonic and blue-shifted non-solitonic components at different frequencies. The solitonic pulses shift further towards the red as they propagate through the nonlinear medium due to the Raman-induced self-frequency shift.

Accordingly, frequency downshifting effects are also known to occur in water wave propagation and it has been noted that the Raman self-frequency shift produces an analogous effect in optics. The nonlinear processes responsible for supercontinuum generation amplify the noise present in the initial laser pulse. Especially for long pulses and continuous-wave input radiation, modulation instability—a nonlinear wave-mixing process—broadens the spectrum from seed noise in the initial stages of propagation and, as a result, the output spectrum is highly sensitive to the initial conditions.

Thus, the present invention pertains to stimulated supercontinuum generation, the related phenomenon of optical rogue waves, and more generally to rogue waves in other contexts. A novel method and system of creating supercontinuum with lower power threshold, in addition to stabilizing supercontinuum generation, is detailed.

In addition, a novel high-contrast optical switch is detailed, which allows for control of a strong optical field using only a weak optical field, based on control of optical rogue waves.

More broadly, the present invention includes the prediction, generation, and destruction of rogue waves in other physical contexts, including hydrodynamic or oceanic rogue waves.

An aspect of the invention is a method for stimulating an optical rogue wave, comprising the steps of generating an input pulse into a nonlinear optical medium and perturbing the input pulse by directing a narrow-band seed radiation into the input pulse, wherein the seed radiation has a frequency and timing with respect to the input pulse to stimulate broadband radiation within the nonlinear optical medium. In a preferred embodiment, the broadband radiation comprises supercontinuum radiation. This supercontinuum radiation is stable and/or coherent.

Generally, it should be noted that a low-power input pulse can be used to generate supercontinuum radiation, wherein the power input is so low that without said stimulation, it would be insufficient to generate supercontinuum radiation. In particular, it is the characteristics of the seed radiation that stimulate the input pulse to generate supercontinuum radiation.

It is appreciated that the input pulse may also be used to stabilize the output supercontinuum radiation of a high-power input pulse that would produce the supercontinuum radiation in the absence of the seed radiation.

In one embodiment, the broadband radiation comprises one or more solitons.

In another embodiment, wherein the seed radiation comprises a seed pulse timed to coincide with a leading edge of the input pulse. Furthermore the seed radiation is frequency downshifted from the center frequency of the pump pulse. Generally, there is a "sensitive spot" of timing and frequency that provides the optimal conditions for generating supercontinuum radiation. In one embodiment, the nonlinear Schrödinger equation is used to calculate the frequency and timing or "sensitive spot" of the seed radiation.

In one embodiment, the generation of supercontinuum radiation is controlled by varying the signal of the seed radiation.

By controlling the generation of supercontinuum radiation, the threshold of supercontinuum generation may be lowered to reduce noise and pulse-to-pulse fluctuations in the supercontinuum output, the supercontinuum radiation may be stabilized, the supercontinuum generation may be suppressed to reduce noise and pulse-to-pulse fluctuations in the supercontinuum output, or the supercontinuum may be used to create or stabilize white light.

In one embodiment, the seed pulse comprises a weak seed pulse or continuous-wave beam with respect to the input pulse. The seed pulse may also comprise a coherent seed pulse.

In another embodiment, a portion of the supercontinuum radiation output is fed back into the input pulse as a feedback signal. This is particularly useful in creating a coherent seed pulse. The feedback signal may comprise an optoelectronic feedback signal, wherein a photodetector generates the optoelectronic feedback signal, or may be derived from spectral interference of the generated supercontinuum radiation. The feedback signal may also be used to drive a modulator that controls the amplitude of the seed signal. Alternatively, feedback signal is used to alter the current of an amplifier that controls the amplitude of the seed signal In one embodiment, varying the signal of the seed radiation comprises adjusting one or more of the following: the temporal delay of the seed radiation, the power of the seed radiation, the power input to the nonlinear medium (e.g. via changing the power input to a separate seed fiber.

In another embodiment, the supercontinuum radiation is generated by synchronized mode-locked lasers for the input pulse and seed signal sources.

In another embodiment, the generation of supercontinuum radiation may be controlled to form an optical switch that operates "on" or "off" based on the supercontinuum radiation output, e.g. wherein power is transmitted through the optical switch according to the seed signal. In the optical switch embodiment, the method may further include filtering the output supercontinuum radiation to select only a particular wavelength of the output radiation.

Another aspect is an apparatus for generating an optical rogue wave, comprising, a light source coupled to a nonlinear optical medium and configured to generate an input pulse into a nonlinear optical medium. The apparatus further comprises a means for perturbing the input pulse by directing a narrow-band seed radiation into the input pulse, wherein the seed radiation has a frequency and timing to generate broadband radiation, e.g. supercontinuum radiation, within the nonlinear optical medium. Generally the light source comprises a mode-locked laser. However other light generation means are also contemplated.

In one embodiment, the means for perturbing the input pulse comprises a second light source. The second light source may be a mode-locked laser, continuous wave laser, etc. Alternatively, the means for perturbing the input pulse comprises feedback from output of the nonlinear optical medium. The feedback may be from the spectral interference generated from an interferometer coupled to the output of the nonlinear medium, or generated optoelectronically from a photodetector coupled to the coupled to the output of the nonlinear medium.

In another embodiment, a modulator is coupled to the input of the nonlinear optical medium, wherein the feedback signal is used to drive a modulator to control the amplitude of the seed signal.

Alternatively, an amplifier is coupled to the input of the nonlinear optical medium, wherein the feedback signal is used to alter the current of the amplifier to control the amplitude of the seed signal.

In one embodiment, the means for perturbing the input pulse is configured to vary the signal of the seed radiation to control the generation of supercontinuum radiation to either lower its threshold, suppress it, stabilize it, form an optical switch, etc. Additionally, the means for perturbing the input pulse may comprise a module or software for calculating the frequency and timing of the seed radiation from the nonlinear Schrödinger equation.

In one embodiment, wherein the light source comprises synchronized mode-locked lasers configured to generate the input pulse and seed radiation.

Another aspect is a method for generating a rogue wave, comprising: providing an input pulse; perturbing the input pulse by adding a weak phase or amplitude seed perturbation; wherein the frequency and timing of the seed perturbation is configured to generate a supercontinuum energy.

In one embodiment of the current aspect, the rogue wave comprises an optical rogue wave, wherein the supercontinuum energy comprises supercontinuum radiation formed within a nonlinear optical medium, and the input pulse is perturbed by introducing narrow-band seed radiation into the input pulse.

In another embodiment, the generated broadband energy comprises L-shaped amplitude statistics In a further embodiment, wherein the supercontinuum energy comprises a hydrodynamic wave.

Another aspect is an apparatus for detecting optical rogue waves, comprising a detector coupled to the output of the nonlinear optical medium, a filter disposed between the detector and the nonlinear optical medium, a mode locked laser coupled to the input, and a sample source coupled to the input, wherein the detector is configured to only measure optical power if supercontinuum generation has been accelerated by the spectroscopic signature of the sample source.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

Figure 10B:
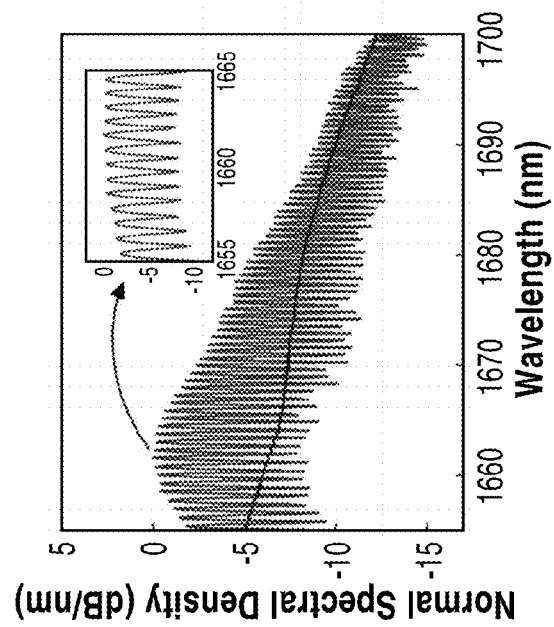
Figure 10A:
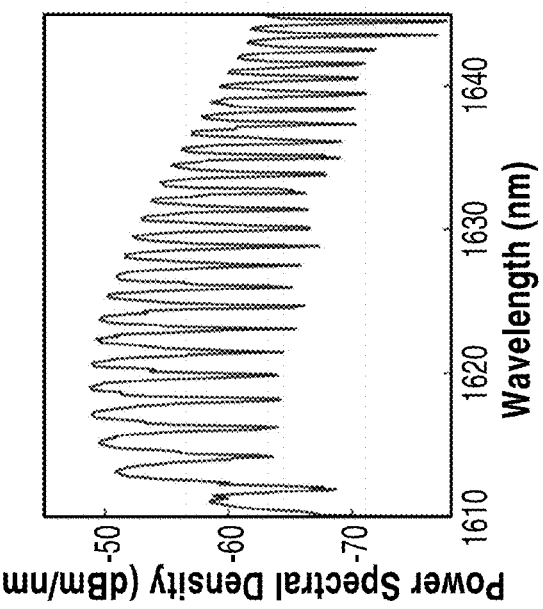

FIG. 10A displays the measured interferogram for the seed pulses used to stimulate supercontinuum in the experiments of the present invention.

FIG. 10B displays the measurement of the coherence of the supercontinuum stimulated by this seed pulse.

FIG. 11 is a schematic diagram of a device for stimulation of supercontinuum generation with a weak optical seed.

FIG. 12 is a schematic diagram a device where a fraction of the supercontinuum output itself is be fed back into the source.

FIG. 13 illustrates schematic diagram of a device for stimulating SC generation with optoelectronic feedback.

FIG. 14 illustrates schematic diagram of a device for stimulating SC generation with use of an interferometer.

FIG. 15 illustrates an alternative device where the feedback signal is used to alter the current of an amplifier delivering a seed pulse.

FIG. 16 illustrates an alternative device where the feedback signal is used to drive a piezoelectric transducer instead of the amplified current.

FIG. 17 illustrates an alternative system where coherent supercontinuum generation is achieved with pump and seed derived from an optical parametric oscillator.

FIG. 18 illustrates a schematic diagram of an alternative system employing a continuous wave laser to drive the seed pulse.

FIG. 19 illustrates an alternative device where independent active or hybrid mode-locked lasers are used to produce the pump and seed pulses for stimulated SC generation.

Figure 21:
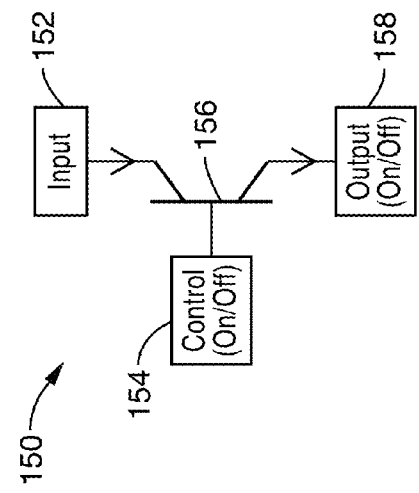
Figure 20:
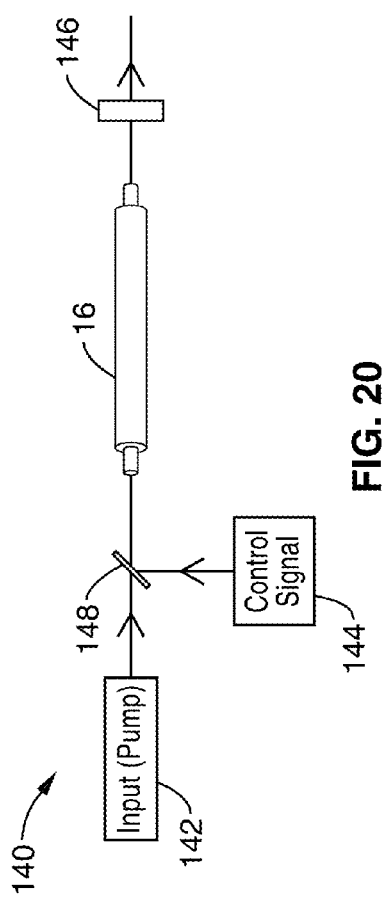

FIGS. 20 and 21 show a schematic diagram of a device for using stimulated supercontinuum as an optical switch or three-terminal device.

Figure 22:
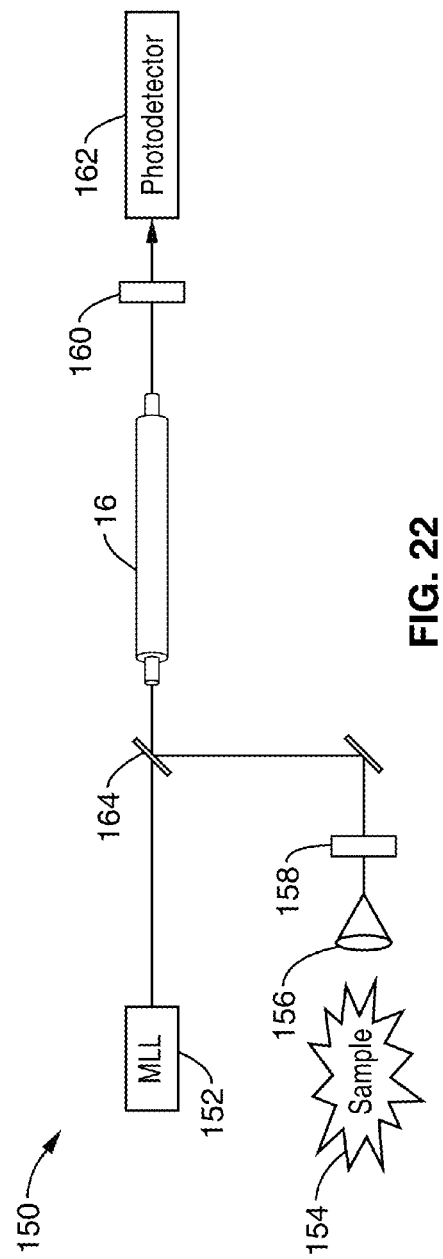

FIG. 22 shows a schematic diagram for a device using stimulated supercontinuum as a binary detector of a weak signal.

DETAILED DESCRIPTION OF THE INVENTION

Referring more specifically to the drawings, for illustrative purposes the present invention is embodied in the apparatus generally shown in FIG. 1A through FIG. 22. It will be appreciated that the apparatus may vary as to configuration and as to details of the parts, and that the method may vary as to the specific steps and sequence, without departing from the basic concepts as disclosed herein.

Past observations indicate that rogue waves have unusually steep, solitary or tightly-grouped profiles, which appear like "walls of water". These features imply that rogue waves have relatively broadband frequency content compared with normal waves and also suggest a possible connection with solitons—solitary waves, that propagate without spreading in water due to a balance between dispersion and nonlinearity.

Accordingly, 'rogue wave' is herein defined to mean a wave form that has an extremely steep, solitary or tightly grouped profile, with relatively broadband frequency content and a sharp, steep profile in the time domain (e.g. exceptionally steep leading and trailing edges). Traditionally, the term 'rogue' is defined to be large, destructive, and unpredictable. However, for purposes of this description, which seeks to demonstrate that rogue waves can be predictably generated for considerable utility, the traditional 'unpredictable' association of the term 'rogue' may not apply to certain aspects of the present invention.

In addition to hydrodynamics, there are other physical systems that possess similar nonlinear characteristics and may also support rogue waves. The description below details numerical modeling of 'optical rogue waves' in a system based on probabilistic supercontinuum (SC) generation in a highly nonlinear optical fiber. The term 'optical rogue wave,' not previously used in the art, is based on striking phenomenological and physical similarities between oceanic waves and the extreme events found by using novel optical system of the present invention.

A critical challenge in observing optical rogue waves is the lack of real-time instruments that can capture a large number of very short random events in a single shot. To solve this problem, the present invention uses a wavelength-to-time transformation technique inspired by the concept of photonic time-stretch analog-to-digital conversion. In the present technique, group-velocity dispersion (GVD) is used to temporally stretch the waves so that many thousands of random ultrashort events can be captured in real-time. The real-time capture of a large number of random events is unique to the present invention. Using the method of the present invention, a small, but statistically-significant fraction of extreme waves can be discerned from a large number of ordinary events, permitting the first observation of optical rogue waves.

Section I

Figure 1A:
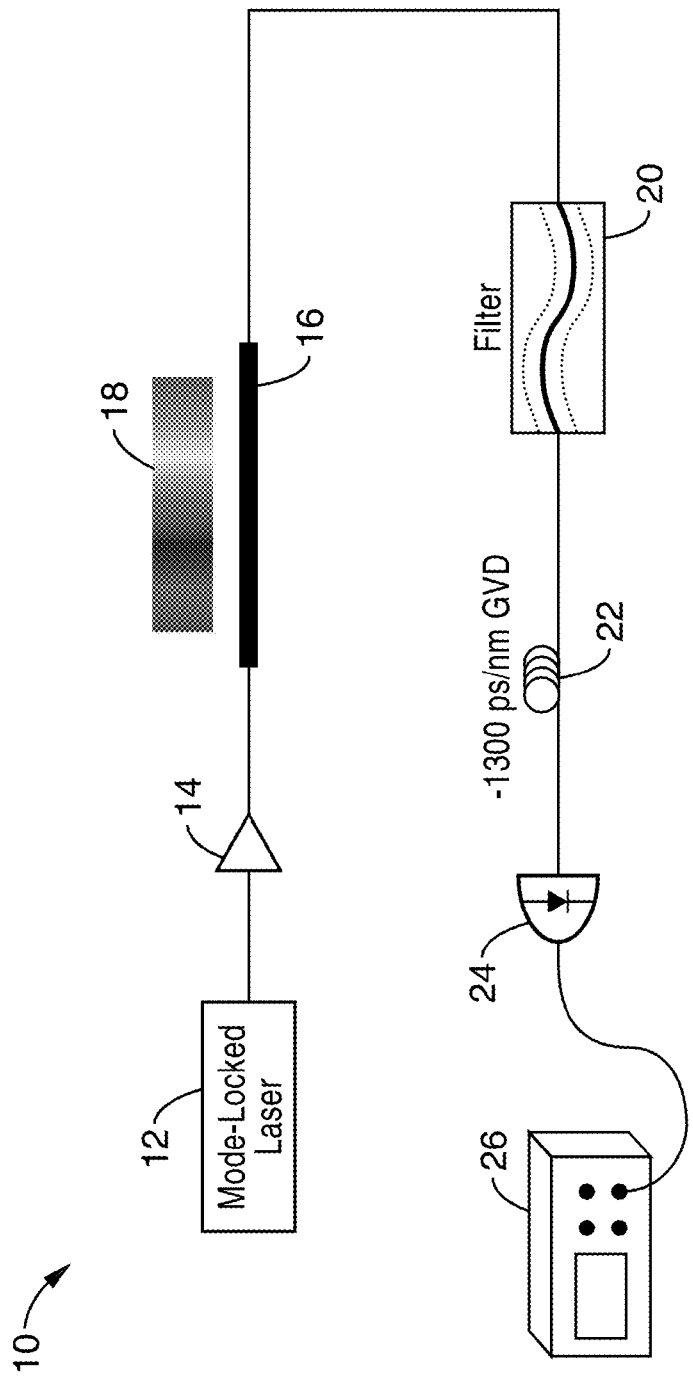
FIG. 1A illustrates a schematic diagram of an apparatus for generation of supercontinuum radiation and observation of optical rogue waves in accordance with the present invention.
Figure 1B:
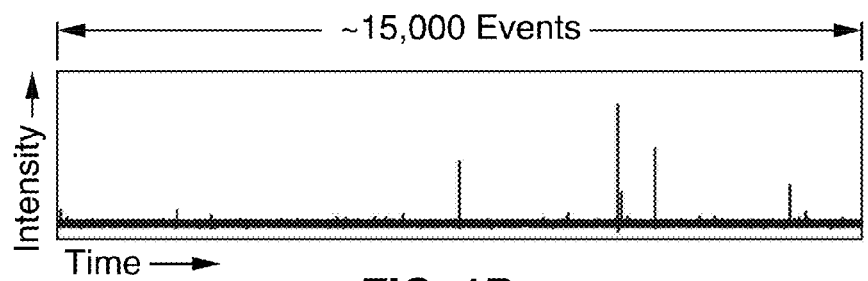
FIG. 1B through 1G are plots of single-shot time traces containing approximately 15,000 pulses each and associated histograms for three different low power levels using the apparatus of FIG. 1A.
Figure 1C:
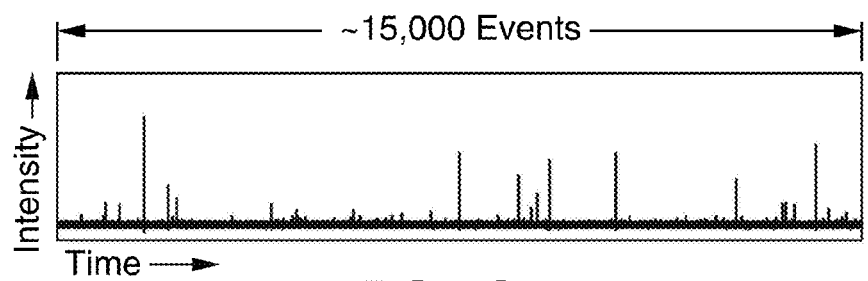
Figure 1D:
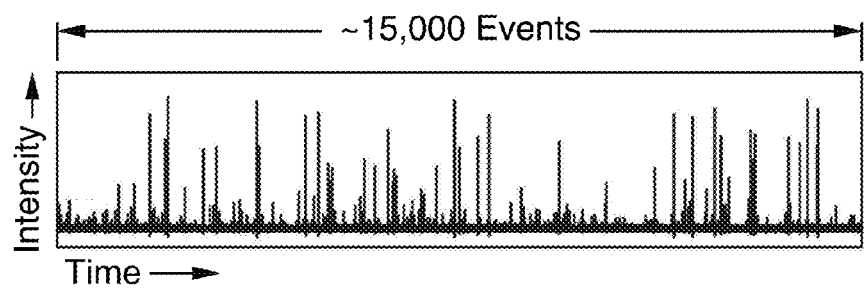
Figure 1E:
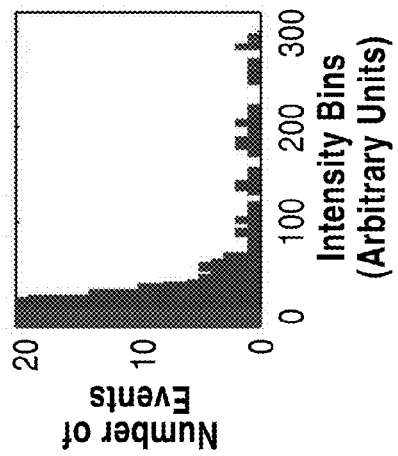
Figure 1F:
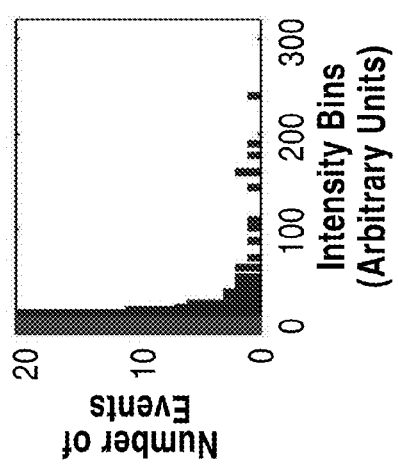
Figure 1G:
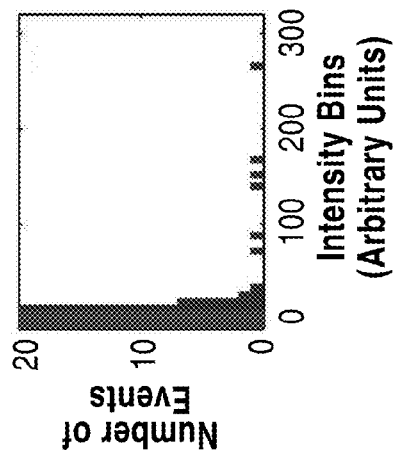

FIG. 1A illustrates a schematic diagram of an apparatus 10 for experimental generation of supercontinuum radiation and observation of optical rogue waves. Apparatus 10 comprises a mode-locked laser 12 as a light source to send picosecond seed pulses at 1064 nm into a Yb-doped fiber amplifier that is then output to a highly-nonlinear microstructured optical fiber 16 with matched zero-dispersion wavelength to generate supercontinuum radiation 18. The output is red-pass filtered at 1450 nm via filter 20 and stretched as described above with −1300 ps/nm (GVD) so that many thousands of events can be captured with high resolution in a single-shot measurement. Readings from the photodetector 24 are then captured with a real time oscilloscope 26. It should be noted that many of the experimental parameters described herein (e.g. 1064 nm, −1300 ps/nm) may have been chosen arbitrarily and/or for ease of use in testing. While these parameters worked in this particular experimental situation, it is appreciated that other experimental conditions may also potentially deliver similar effects.

Using the setup of FIG. 1A, large sets of pulses are acquired in real time for very low seed pulse power levels—power levels below the threshold required to produce appreciable supercontinuum. The pulse-height distributions are sharply peaked with a well-defined mean, but quite surprisingly that rare events also appear with far greater intensities FIG. 1B through FIG. 1G illustrate plots of single-shot time traces containing approximately 15,000 pulses each and associated histograms for three different low power levels: 0.8 μW (FIGS. 1B, 1E), 3.2 μW (FIGS. 1C, 1F), and 12.8 μW (FIGS. 1D, 1G), respectively. The gray shaded area in each histogram demarcates the noise floor of the measurement process. In each measurement, the vast majority of events (>99.5% for the lowest power) are buried in this low intensity range, while the rogue events reach intensities of at least 30-40 times greater than the average value. These distributions are extremely different from those encountered in most stochastic processes.

In these traces, the vast majority of events are concentrated in a small number of bins and are so weak that they are buried beneath the noise floor of the measurement process; however, the most extreme ones reach intensities at least 30-40 times greater than the average. The histograms display a clear L-shaped profile, with extreme events occurring rarely, yet much more frequently than expected based on the relatively narrow distribution of typical events.

Since the red-pass filter 20 transmits only a spectral region that is nearly dark in the vast majority of events, the rare events clearly have extremely broadband, frequency-downshifted spectral content. The data also show that the frequency of occurrence of the rogue events increases with the average power, while the maximum height of a freak pulse remains relatively constant. These features indicate that the extreme events are sporadic, single solitons.

The nonlinear Schrödinger equation (NLSE) models soliton dynamics and also is used in the present invention to predict optical rogue waves. The generalized NLSE incorporates dispersion and the Kerr nonlinearity, as well as approximations for self-steepening and the vibrational Raman response of the medium. The NLSE may also be used for qualitatively explaining our experimental results. In anticipation of broadband application, several higher orders of dispersion in the nonlinear fiber are included, which were calculated from the manufacturer's test data (see Methods I). Similarly, higher-order dispersion may also be employed to extend the validity of the NLSE for broadband calculations in hydrodynamics.

The methods of the present invention show a high-power, smooth input pulse ejects multiple red-shifted solitons and blue-shifted non-solitonic components, and a tiny amount of input noise varies their spectral content. On the other hand, for low power levels, the spectral content of the pulse broadens, but no sharp soliton is shed. In this case, the situation changes dramatically when a tiny amount of noise is added. This perturbation is amplified by nonlinear interactions including modulation instability, which dramatically lowers the soliton-fission threshold and permits unpredictable freak events to develop. Interestingly, the hydrodynamic equivalent—the Benjamin-Feir modulation instability—is also thought to initiate hydrodynamic rogue waves. This instability spreads spectral content from a narrow bandwidth to a broader range in the initial stages of water wave propagation, just as it does in this optical system.

A stochastic perturbation is included in the simulations by adding to the initial pulse envelope a small amount of bandwidth-restricted random noise with amplitude proportional to the instantaneous field strength. The NLSE is then solved repeatedly for a large number of independent events. For a small fraction of events, the spectrum becomes exceptionally broad with a clear red-shifted solitonic shoulder.

Figure 2A:
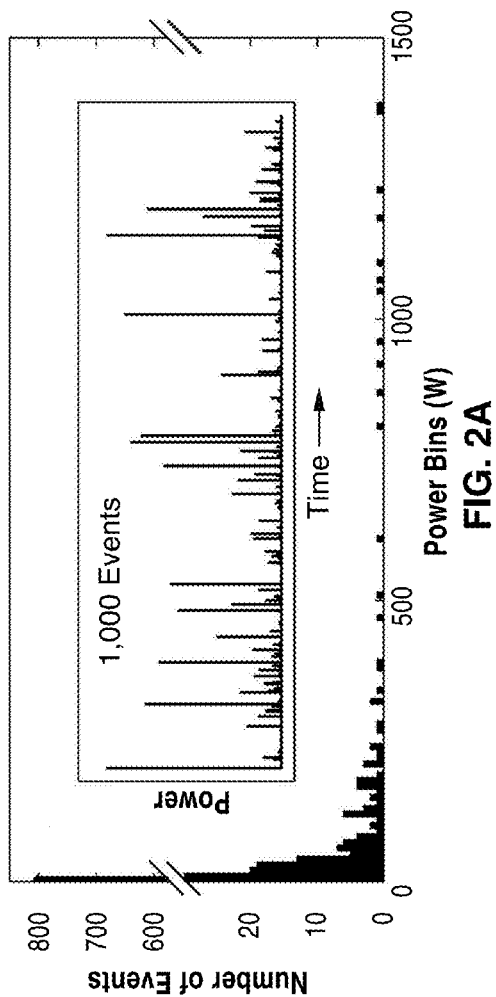
FIGS. 2A through 2C show the simulation of optical rogue waves using the generalized nonlinear Schrödinger equation and the apparatus of FIG. 1A.
Figure 2B:
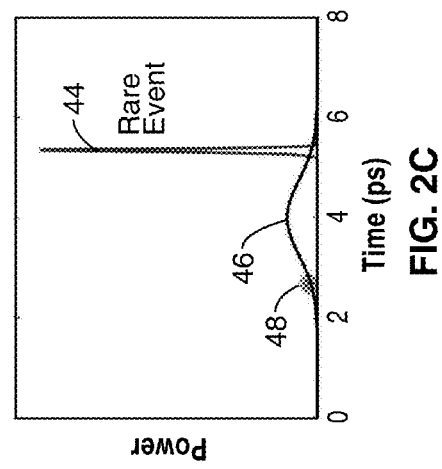
Figure 2C:
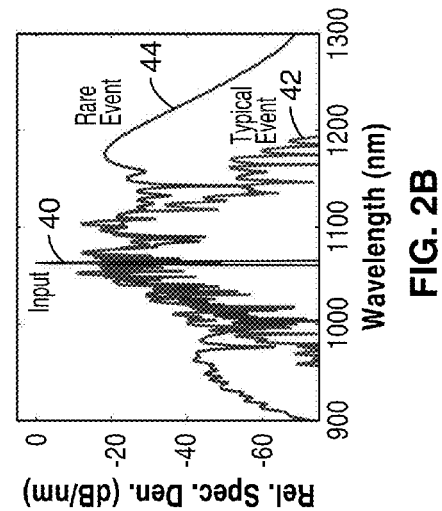

FIG. 2A through FIG. 2C illustrate the simulation of optical rogue waves using the generalized nonlinear Schrödinger equation. FIG. 2A shows the time trace and histogram of peak heights for a trial of 1000 events after red-pass filtering (from 1155 nm) each output pulse at the start of the solitonic shoulder is illustrated (see FIG. 2B). The initial (seed) pulses have width=3 ps, peak power=150 W, fractional noise=0.1%, and noise bandwidth=50 THz. The vertical axis of the histogram contains a scale break to facilitate viewing the disparity between the most common events at low peak power and the rogue events at high peak power.

FIG. 2B illustrates complete relative spectral densities of the input pulse 40, a typical event 42 and the rare event shown 44. Clearly, the histogram of heights is sharply peaked but has extended tails, as observed in the experiment, and the distribution contains rogue events >50 times larger than the mean. The same rogue events are identified regardless of where the filter is located within the smooth solitonic shoulder and can also be identified from the complementary non-solitonic blue side of the spectrum.

FIG. 2C shows the dramatically different temporal profiles of the seed pulse 46 and the rare event 44 indicated in the histogram. The rogue pulses have exceptionally steep leading and trailing edges compared with the initial pulses and the typical events. The typical events from the histogram are so small that they are not visible on the linear power scale illustrated in FIG. 2C. The shaded region 48 on the seed pulse delineates the time window that is highly sensitive to perturbation.

Figure 3:
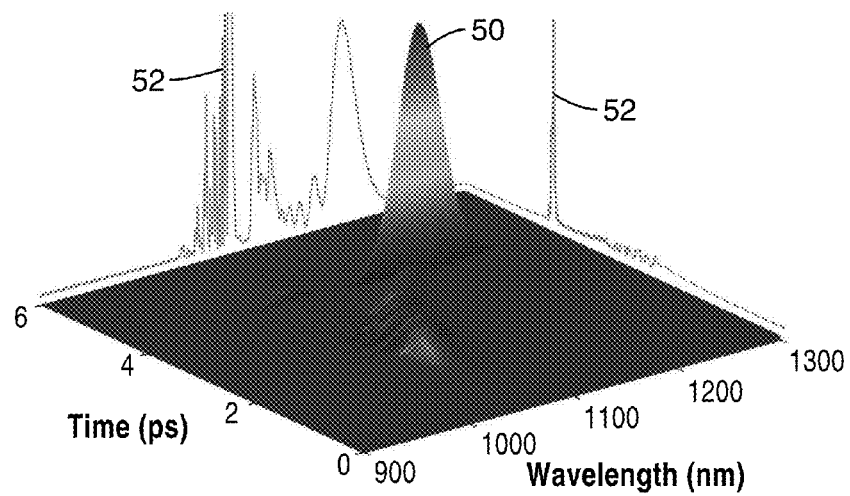
FIG. 3 illustrates the time-wavelength profile of an optical rogue wave where the power is displayed as a function of both wavelength and time using a short-time Fourier transform.

FIG. 3 illustrates the time-wavelength profile of an optical rogue wave where the power is displayed as a function of both wavelength and time using a short-time Fourier transform. The optical wave 50 has broad bandwidth and has extremely steep slopes in the time domain compared with the typical events and appears as a "wall of light" analogous to the "wall of water" description of oceanic rogue waves. The rogue wave travels a curved path in time-wavelength space due to the Raman self-frequency shift and group velocity dispersion, separating from non-solitonic fragments and remnants of the seed pulse at shorter wavelengths. The traces 52 show the full time structure and spectrum of the rogue wave. The spectrum contains sharp spectral features that are temporally broad and, thus, do not reach large peak power levels and do not appear prominently in the short-time Fourier transform. Since there are no apparent features in the perturbations that lead to the development of the rogue events, their appearance seems unpredictable.

In order to pinpoint the underlying feature of the noise that produces rogue waves, the temporal and spectral properties of the initial conditions were closely analyzed. Examining the correlations between the initial conditions and their respective output waveforms, it was found that if the random noise happens to contain energy at a frequency shift of approximately 8 THz within a 0.5 ps window centered about 1.4 ps before the pulse peak (FIG. 2C)), a rogue wave is born.

Figure 4:
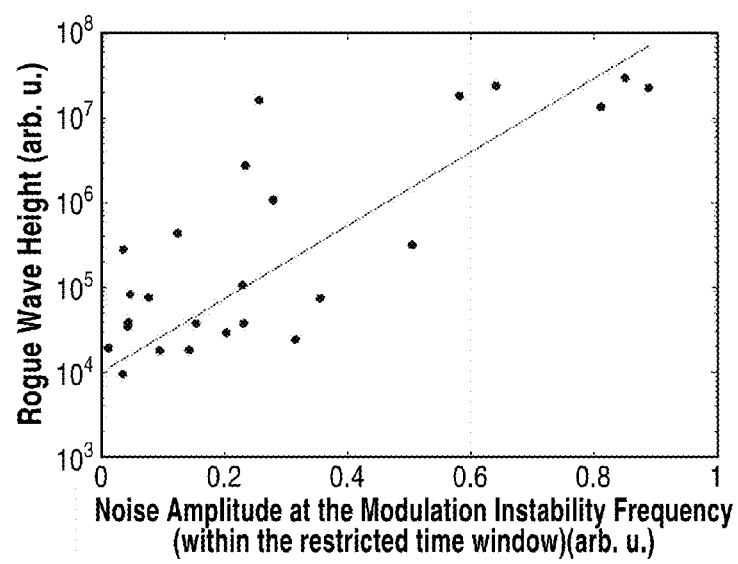
FIG. 4 illustrates rogue wave height vs. noise spectral density at the modulation instability frequency and within the restricted window.

FIG. 4 illustrates rogue wave height vs. noise spectral density at the modulation instability frequency (within the restricted time window) in the initial conditions. The modulation instability frequency is 8 THz and the time window is 0.5 ps wide, centered 1.4 ps before the pulse peak. As shown in FIG. 4, there is a clear correlation between rogue wave height and the noise amplitude within the restricted time and frequency windows. Noise at this particular frequency and on a leading portion of the pulse envelope efficiently seeds modulation instability, reshaping the pulse to hasten its breakup. The output wave height correlates in a highly nonlinear way with this specific aspect of the initial conditions. Thus, the normal statistics of the input noise are transformed into an extremely skewed, L-shaped distribution of output wave heights. Thus, the pulse is highly sensitive to these particular noise parameters. Nevertheless, the specific feature identified in the initial conditions offers predictive power for optical rogue waves, as well as oceanic rogue waves.

The rogue waves exhibit a number of other intriguing properties warranting further study. For example, they propagate without noticeable broadening for some time, but have a finite, seemingly unpredictable lifetime before they suddenly collapse due to cumulative effects of Raman scattering. Raman scattering seeded by noise dissipates energy or otherwise perturbs the soliton pulse beyond the critical threshold for its survival. This decay parallels the unpredictable lifetimes of oceanic rogue waves. The rogue optical solitons are also able to absorb energy from other wavepackets they pass through, which causes them to grow in amplitude, but appears to reduce their lifetime. A similar effect may help to explain the development of especially large rogues in the ocean.

As shown in FIG. 1, the test setup for the experiments in Section 1 use a supercontinuum source that consists of a master oscillator, a fiber amplifier 14, and a 15-meter length of highly-nonlinear microstructured fiber 16 whose zero-dispersion point matches the seed wavelength. The master oscillator is a mode-locked ytterbium-doped fiber laser 12 producing picosecond pulses at approximately 1064 nm with a repetition rate of 20 MHz. The output pulses are amplified to a desired level in a large-mode-area ytterbium-doped-fiber amplifier 14. This amplification process yields chirped pulses of ~5 nm bandwidth and temporal width of a few picoseconds.

The wavelength-to-time transformation for real-time detection is accomplished using a highly-dispersive optical fiber producing approximately −1300 ps/nm of GVD over the wavelength range of interest. Since the supercontinuum output is red-pass filtered with a cut-on wavelength of 1450 nm, adjacent pulses do not overlap in time after being stretched. The GVD-stretched signal is then fed to a fast photodetector 24 and captured by a real-time 20 gigasample-per-second oscilloscope 26, which records sequences of ~15,000 pulses with high temporal resolution in a single-shot measurement.

The detection of rogue events is insensitive to the filter window, so the specific choice of the red-pass cut-on wavelength is not critical. The soliton shoulder shown FIG. 2B is smooth and extends to very long wavelengths, so a freak soliton can be detected by examining any section of this extended region. Due to experimental constraints, the measurements are limited to the long-wavelength tail of the soliton shoulder, whereas, in the simulations, it is instructive to capture the entire soliton spectrum. The simulations show that it is acceptable to experimentally detect the rogue events by their red tails because the same rogue events are identified no matter where the filter is located throughout this spectral region.

The simulations are based on the nonlinear Schrödinger equation (NLSE). The NLSE describes the evolution of the slowly-varying electric field envelope, A(z,t), in the presence of temporal dispersion and nonlinearity. In its generalized form, the NLSE accounts for dispersion as well as both the electronic (instantaneous) and vibrational (delayed) nonlinearities in silica glass. For many applications, it is sufficient to employ approximations for these nonlinearities that are physically intuitive and efficient for numerical computations using the well-known split-step method. Relative to a reference frame co-moving with the optical pulse, this form of the equation can be expressed as:

$$\frac{\partial A}{\partial z} - i\sum_{m=2} \frac{i^m \beta_m}{m!} \frac{\partial^m A}{\partial t^m} = i\gamma\left[|A|^2 A + \frac{i}{\omega_0}\frac{\partial}{\partial t}(|A|^2 A) - T_R A \frac{\partial |A|^2}{\partial t}\right]$$

where $\beta_m$ are values that characterize the fiber dispersion, $\gamma$ is the nonlinear coefficient of the fiber, $\omega_0$ is the central carrier frequency of the field, and $T_R$ is a parameter that characterizes the delayed nonlinear response of silica fiber. The bracketed terms on the right-hand side of the equation describe the Kerr nonlinearity, self-steepening, and the vibrational Raman response of the medium, respectively. For completeness, the self-steepening term is included in these simulations, but it has been determined that it is not required for rogue wave generation. The Kerr term produces self-phase modulation and the Raman term causes frequency downshifting of the carrier wave.

In our calculations, dispersion is included up through sixth order, which was calculated from the manufacturer's test data (see Crystal Fibre NL-5.0-1065 for fiber specifications). Operating at the zero dispersion wavelength of the fiber, the following dispersion parameters were used: $\beta_2 \approx 0$, $\beta_3 = 7.67 \times 10^{-5}$ ps$^3$/m, $\beta_4 = -1.37 \times 10^{-7}$ ps$^4$/m, $\beta_5 = 3.61 \times 10^{-10}$ ps$^5$/m, and $\beta_6 = -5.06 \times 10^{-13}$ ps$^6$/m. The nonlinear coefficient and the Raman response parameter are given by: $\gamma = 11$ W$^{-1}$km$^{-1}$ and $T_R = 5$ fs. Although these numbers model the experimental situation, the NLSE may produce rogue wave solutions with other values of the parameters.

In a preferred method for generating rogue waves in accordance with the present invention, the input pulse is perturbed by adding a very small amount of amplitude noise directly to its temporal envelope. Specifically, at each point in time, a small random number is added to the input field envelope. The noise amplitude at each point is proportional to the instantaneous amplitude of the pulse. The peak power of the unperturbed pulse is chosen to be small enough that the pulse will not break up without the noise perturbation. A frequency bandpass filter is then applied to limit the input noise to a relatively narrow bandwidth around the seed wavelength, sufficient to mimic the optical noise bandwidth of the input field in the experiment. The specific noise amplitude and peak power of the pulse are not critical, but influence the rogue wave generation rate. Noise amplitudes on the order of 0.1% of the pulse amplitude or even significantly less are adequate to observe a rare, but reasonable generation rate. Although noise is included in this particular way, it is appreciated that this specific form is not required to create rogue waves, as other perturbations (e.g. noise with different spectral bandwidths, amplitudes, probability statistics, etc.) may produce similar results. This particular form of noise serves as a conceptually simple perturbation that qualitatively accounts for our experimental results. When the NLSE is solved repeatedly given these conditions, rogue waves are produced as statistically rare events from members of an initial population that are nearly indistinguishable.

Section II

Supercontinuum (SC) radiation is plagued by large spectral and temporal fluctuations, owing to the spontaneous initiation of the generation process. These fluctuations impede critical applications of supercontinuum. We are able to utilize the rogue wave instability described above to introduce a powerful means of coherent control over supercontinuum generation by stimulating the process with a very weak optical seed signal. This minute addition significantly reduces the input power threshold for the process and dramatically increases the stability and coherence of the resulting radiation. This effect represents an optical tipping point, as the controlled addition of a specialized, but extraordinarily weak perturbation powerfully impacts a much stronger optical field, inducing a drastic transition in the optical system. We demonstrate that this versatile optical leverage can also be used for high-contrast optical switching.

Noise plays a significant role in SC generation: the combination of dispersion and nonlinearity amplifies the noise present in the input light, which can seriously degrade the stability of the SC. This instability comprises significant spectral fluctuations, loss of coherence, and other forms of jitter. For example, single-shot measurements reveal fine spectral variability that escapes unnoticed when many pulses are averaged together. These instabilities negatively impact many important applications of SC, such as optical frequency metrology, generation of ultrashort optical pulses, photonic time-stretch analog-to-digital conversion, and optical coherence tomography. Optical coherence tomography, for example, an important biomedical imaging technique, requires a low-cost source of broadband radiation, but loses sensitivity because of intensity noise.

As described above in Section 1, at the heart of soliton-fission based SC generation is a nonlinear growth process known as modulation instability (MI). This effect adds sidebands to narrow-band input radiation, increasing the optical bandwidth of the input pulse until the Raman-induced self-frequency shift can separate it into red-shifted solitons. Because the MI growth starts spontaneously from background noise and amplifies its influence, the subsequent initiation of soliton fission becomes inherently unpredictable. Particularly for longer input pulses, much of the initial spectral broadening preceding soliton fission is spontaneously initiated by either shot noise, spontaneous emission, or other source fluctuations as a result, the resulting SC can become nearly incoherent away from the pump wavelength, and is subject to large pulse-to-pulse spectral variations. Below the power threshold for soliton fission, it has been described here that this variability can be so extreme that rare, but bright flashes of white light—optical rogue waves—are produced. These rogue waves are produced by SC generation accelerated by a specific type of noise in the input, showing a path to stimulate their generation.

The methods of the present invention demonstrate that SC generation can be controlled by applying a tailored, but extremely weak coherent seed pulse. The pulse, although very weak, stimulates SC generation by initiating modulation instability with a controlled signal rather than noise. This seed pulse lowers the input pump power threshold, and reduces the noise-induced instability of the resulting white light. The enhancement and stabilization of SC generation with a weak stimulus has not yet been demonstrated in the art.

SC seeding resembles the manner in which a nucleation point facilitates the initiation of boiling in hot water. Without nucleation sites, water must be superheated to initiate boiling, which results in a spontaneous, uncontrolled process. Similarly, conventional (unseeded) SC generation has a larger power threshold and begins randomly. Like a pot of nearly boiling water, light at the cusp of SC generation is at a tipping point—a minute perturbation can have a powerful effect on the system, stimulating the onset of a dramatic transition. In the time domain, this tipping point also has a striking manifestation: whereas unseeded sub-threshold pump pulses generate only rare flashes of SC radiation, introduction of the seed causes the once rare events to become the predictable norm. In our experiments, we employ an accurately timed, frequency-shifted, weak seed pulse, which lowers the SC power threshold by more than 25% and produces optical switching with a dynamic range of 30 dB. Remarkably, it reduces the pulse-to-pulse standard deviation of power spectral density by 90%, and also increases the pulse-to-pulse coherence of the output light dramatically.

Figure 5:
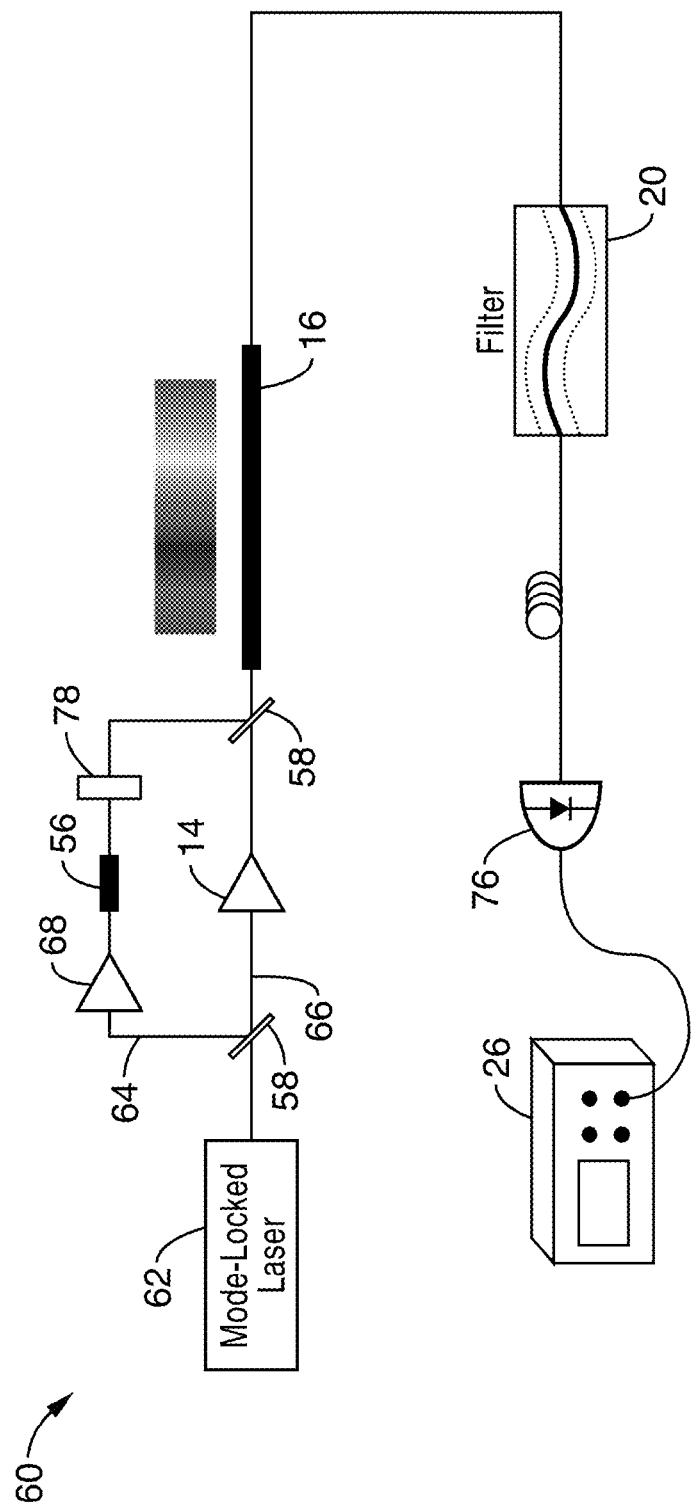
FIG. 5 illustrates a schematic diagram of an alternative apparatus for generation of stimulated supercontinuum radiation and observation of optical rogue waves in accordance with the present invention.

Referring to the test setup 60 in FIG. 5, a mode-locked laser 62 producing near transform-limited picosecond pulses centered at 1550 nm (25 MHz repetition rate) serves as the master optical source in these experiments. The primary portion 66 of the laser output is filtered to a bandwidth of ~1 nm and amplified using a large-mode-area erbium-doped fiber amplifier 14. The amplified pulses are ~3.7 ps in duration, as determined by autocorrelation. These pump pulses are directed into a highly-nonlinear optical fiber 16 (15 m length, Corning HNL ZD 1550) with very low dispersion at 1550 nm.

A minute portion 64 of the laser output is split with beamsplitter 58 to form a weak seed pulse that is used to stimulate the generation process. Portion 64 is directed into an independent optical amplifier 68 and nonlinear seed element 56 to produce a small amount of spectral broadening of the input. This broadened light is then directed in filtered with filter 78 to select a weak portion of the tail of this broadened spectrum (0.01% of the pump intensity) centered near 1630 nm for use as the seed pulse. The seed 70 is precisely timed with the pump 72 (see FIG. 6A) and delivered to the highly nonlinear fiber 16 along with the pump 72. This process produces a seed that is frequency-shifted from the main pump pulse. As will be described in further detail below, the parameters of this frequency shifting are important in stimulating SC radiation.

In the above setup, the seed may retain coherence even though it was produced by broadening a portion of the input light, because significant broadening is not necessary to make the weak spectral tail that is used as the seed. Additionally, one can use a nonlinear seed fiber 56 that is designed to produce relatively stable, but not especially bright, broadened spectra.

In the setup 60 of FIG. 5, the power input to the seed fiber 56 or the pump power from laser 62 may be controlled to vary supercontinuum generation. Changing the power input to the seed fiber 56 changes the seed spectrum delivered to the nonlinear medium 16. As will be described below, other means (such as feedback) may be used to adjust the seed spectrum.

It is also appreciated that an independent continuous-wave laser (not shown in FIG. 5, see FIG. 18) can be optionally used as the seed (eliminating path 64 in this case).

Figure 6A:
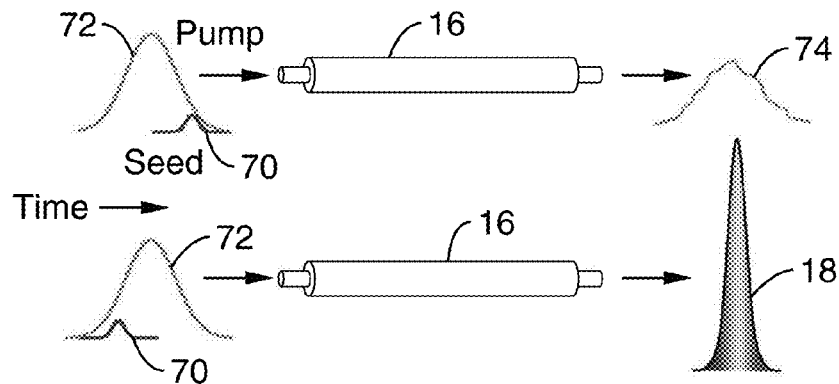
FIG. 6A is a schematic diagram illustrating the impact of a weak coherent seed on the input pulse.

As illustrated schematically in FIG. 6A, the output light depends dramatically on the timing of this weak seed with the input pulse. If the seed 70 is properly timed (e.g. on the leading edge/slope (prior to the peak) of the pump pulse 72) and has the correct center frequency (negative shift in frequency), SC 18 is readily produced (bottom); whereas, no SC is generated otherwise in output 74 (top).

At the output of the nonlinear fiber 16, the spectrum of the radiation is measured with a conventional spectrometer 76.

Figure 6B:
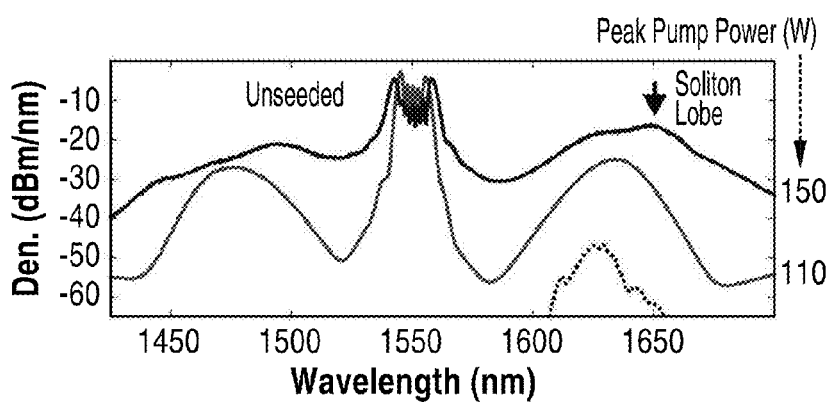
FIGS. 6B and 6C show measurement of supercontinuum spectra at the indicated pump peak power levels with and without the addition of a properly timed weak seed.
Figure 6C:
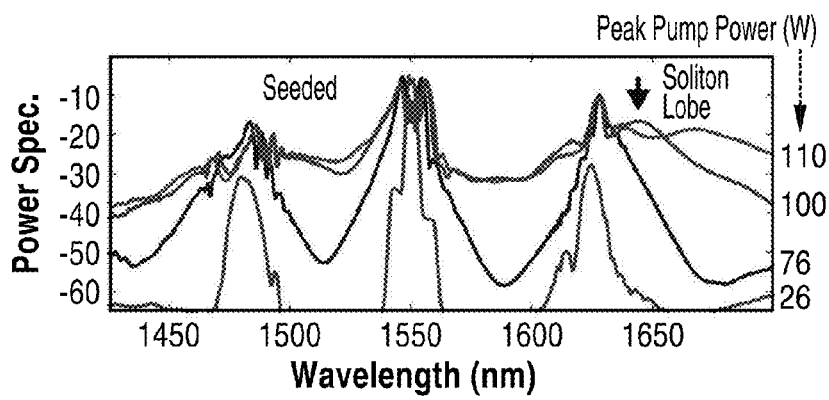

FIGS. 6B and 6C show measurement of supercontinuum (SC) spectra at the indicated pump (peak) power levels with and without the addition of a properly timed weak seed. The small arrows indicate the shedding of a soliton lobe from the red-shifted modulation-instability (MI) wing. When the seed is present (FIG. 6C), the soliton lobe is clearly discernable from the sharpened MI wing.

In FIG. 6B, the output spectra for pump power levels is shown below and above threshold without the proper timing of the weak seed. Below threshold, the central portion of the spectrum shows the characteristic undulations of self-phase modulation of the input light (fine oscillations on the central peak), along with broad MI wings. As the input power is increased, the central portion of the spectrum continues to broaden, and the power within the MI lobes increases until a soliton is ejected from the red lobe. The soliton ejection marks the beginning of soliton fission, which leads to significant spectral broadening. When the weak seed 70 is not properly timed, it has essentially no effect.

However, the output changes dramatically when the seed 70 is properly timed with the pump 72 (as shown in FIG. 6C). At low pump power, the MI lobes become sharper, and the power threshold for soliton fission is reduced.

These spectra clearly show that SC generation is significantly accelerated by an extremely weak seed pulse. To quantify the spectral width of the SC, a portion of the SC spectrum ($\lambda \approx 1685$ nm, $\Delta\lambda \approx 10$ nm) is carved out beyond the red edge of the seed. The output power is monitored within this wavelength band as a function of the pump power, with and without the properly timed seed.

Figure 7B:
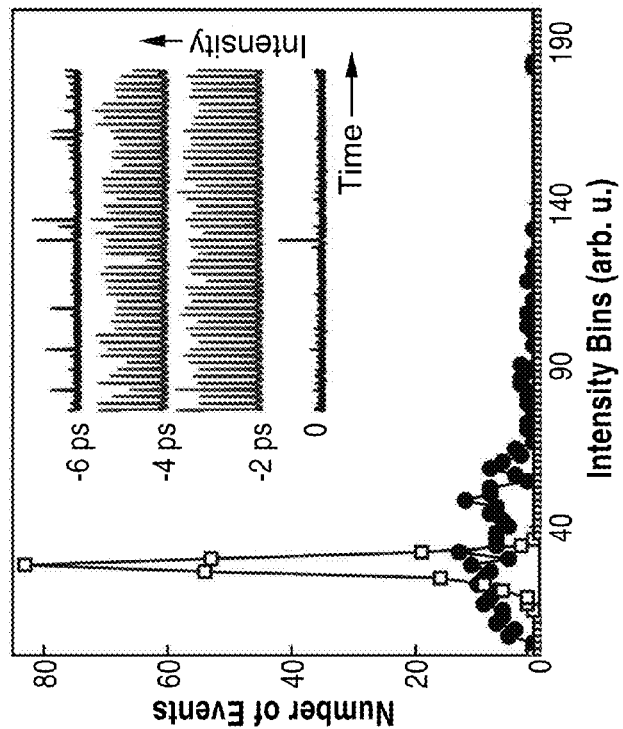
FIGS. 7A and 7B illustrate experimental measurement of SC output with and without stimulation.
Figure 7A:
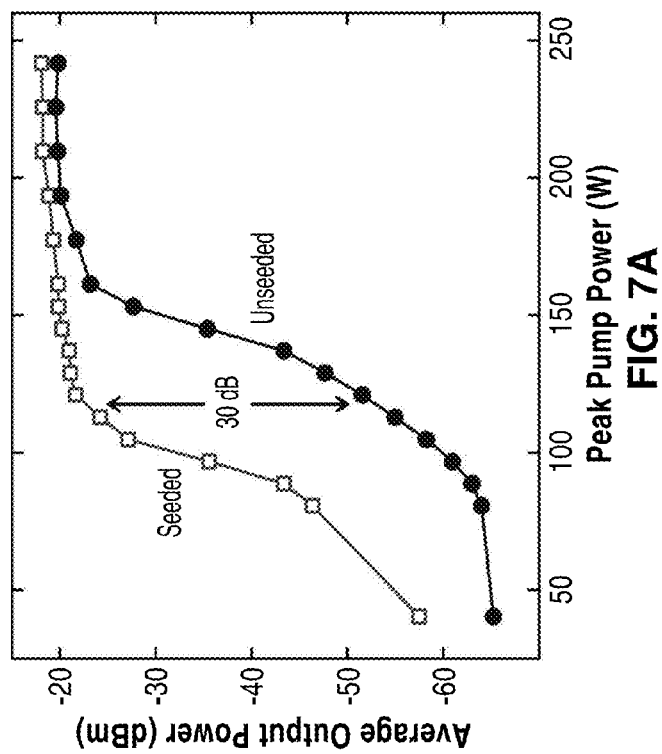

Next, real-time detection was used to directly measure the impact of the seed on the pulse-to-pulse spectral fluctuations of the SC. FIGS. 7A and 7B illustrate experimental measurement of SC output with and without stimulation.

FIG. 7A shows (filtered) SC power with and without seeding. SC generation exhibits a sharp threshold, which is substantially reduced when the seed is added.

FIG. 7B shows statistical histograms of measured (bandpass-filtered) SC pulse-to-pulse intensity with and without the properly-timed weak seed (~100 events each). The pump power was adjusted (peak power ~130 W seeded, ~200 W unseeded) to keep the average SC output power constant.

The inset in FIG. 7B illustrates segments of the filtered SC pulse train for different time delays of the seed. Negative time delays correspond to an advanced seed pulse. When the seed is improperly timed, intense flashes of SC are rare; however, with proper timing, the intense events become the norm.

The histograms show that the weak seed dramatically reduces the statistical variation in the SC spectrum (90% reduction in the standard deviation of pulse-to-pulse intensity variations in the seeded SC). Moreover, the addition of the seed, which is 10,000 times weaker than the pump, creates a power contrast of 30 dB, an effect that can be utilized for high-contrast optical switching.

Furthermore, the fluctuations clearly depend on the relative delay between the pump and seed. When the seed is not present, only rare, unpredictable SC pulses (i.e., optical rogue waves) are produced. These measurements prove that seeding facilitates controlled SC generation from a pump pulse that would otherwise have insufficient intensity to produce significant SC. Moreover, it is expected that even greater stability can be achieved with this approach, if the current limitations from residual seed fluctuations are reduced.

To analyze the problem in more detail, seeded SC generation was numerically modeled using the generalized nonlinear Schrödinger equation (NLSE) as described above. Using the NLSE, the SC spectrum was calculated as a function of the relative time delay and frequency shift between the pump and seed pulses, and the amount of broadening by the red-shifted energy was quantified.

Figure 8C:
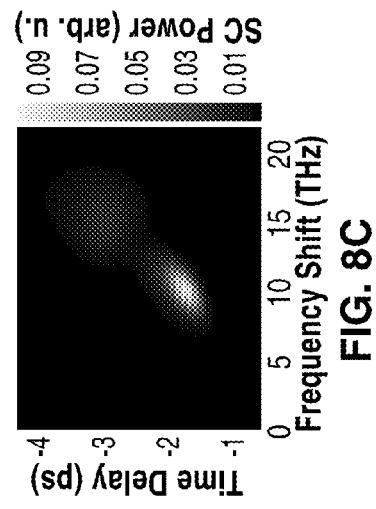
FIGS. 8A through 8C show calculations data displaying the "sensitive spot" of time-frequency shifts over which the seed induces significant SC output.
Figure 8B:
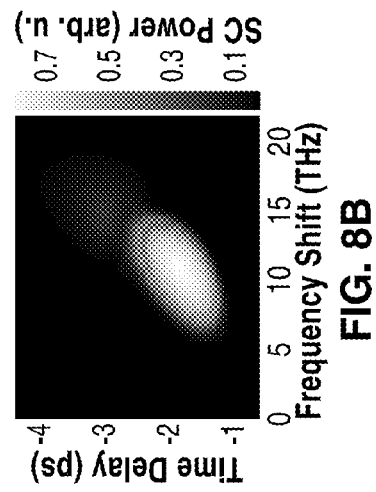
Figure 8A:
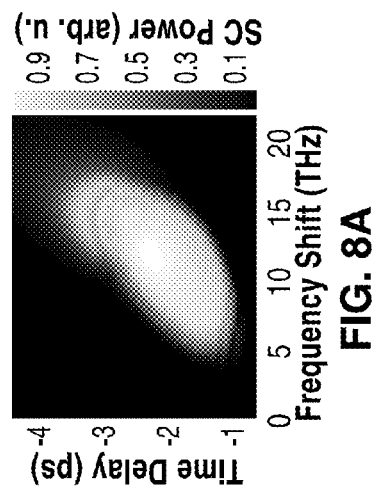

FIG. 8A through FIG. 8C show simulated maps of SC generation vs. timing and frequency shift of a weak seed pulse, with SC power integrated over red-shifted wavelengths ($\lambda > 1680$ nm) as a function of the time delay and frequency shift of the seed pulse for seed intensities: (A) 0.01% of pump, (B) 0.001% of pump, and (C) 0.0001% of pump. The time delay was measured with respect to the center of the pump pulse; negative values correspond to the pump's leading edge. The input pump peak power was 130 W, the pump duration was 3.7 ps, and the seed pulse duration was 200 fs.

A pump pulse was used that has insufficient power to generate SC without the seed, and the effects of unavoidable input noise were included by adding a small amount of bandwidth-limited random noise to its envelope.

As illustrated in the maps of FIGS. 8A-C, this calculation displays a well-defined "sensitive spot" of time-frequency shifts over which the seed induces significant SC output, i.e. where the impact of the seed is maximized. Outside of this vicinity, the impact of the seed is negligible by comparison. As the seed power is reduced, the sensitive spot becomes smaller. For the SC power of FIG. 8A, the "sensitive spot" is bounded by a region between 5 and 15 THz for the frequency shift and a time delay between 0.7 and 3 ps prior to peak. Fringes are visible in the maps to varying degrees, and likely arise from spectral interference.

It should be noted that the above ranges are specific to the parameters of this particular and thus the "sensitive spot" may vary depending on different parameters (e.g. wavelength, or type of nonlinear medium that is used). Different results can be obtained by varying certain parameters. However, it is generally found that the optimal or "sensitive spot" is on the leading edge of the pulse and is frequency downshifted from the center frequency of the pump pulse. Furthermore, there may also be one or more other (less sensitive or suboptimal) sensitive spots that are frequency upshifted from the pump.

This sensitive spot simulation was also performed using the parameters of the 15 m nonlinear fiber described above for 1064 nm. This calculation has produced qualitatively similar results. Quantitative differences must be evaluated using the methods described here depending on the experimental conditions.

Of particular interest is why the input pulse is most sensitive to perturbation within a particular time window. In the present situation, some insight may be found by studying the pulse dynamics in the numerical model. In the initial propagation, Raman scattering is negligible, and modifications to the pump field are originate primarily from the Kerr nonlinearity, which produces self-phase modulation (SPM) and MI. SPM downshifts and upshifts the carrier frequency on its leading and trailing slopes, respectively, where the intensity changes rapidly. The effect of SPM is especially strong for a pulse launched at the zero-dispersion wavelength because the pulse envelope does not disperse quickly. This produces a broadened, chirped pulse, straddling the zero-dispersion wavelength. Normally, MI arises for signals in the anomalous dispersion regime ($\beta_2 < 0$), and does not occur in the normal dispersion regime ($\beta_2 > 0$). If a narrowband pulse is launched into a fiber near its zero-dispersion wavelength ($\beta_2 \approx 0$), MI may still be generated due to higher order dispersion, although the MI frequency shift increases as the total dispersion is reduced. Once the pulse is broadened by SPM, the trailing edge, now in the normal dispersion regime, does not produce MI; however, the leading edge, now in the fiber's anomalous dispersion regime, drives MI with a reduced frequency shift. As a result, these new components are able to excite MI more efficiently. If the MI shift is too large, dispersion causes rapid "walk off" from the appropriate region of the pump pulse, limiting the total gain. On the other hand, if the instantaneous intensity is too low, the MI gain for this portion of the pulse is smaller.

The interplay creates a special region on the pump envelope where the MI gain is large enough and the walk-off is not too rapid. A properly-timed seed with frequency matching the MI shift of this special region experiences the largest cumulative MI gain. Once the MI growth becomes large enough, soliton fission begins suddenly as a large disturbance, travelling much slower than the remnants of the original envelope. This disturbance rapidly disintegrates the original pulse shape, and liberates one or more narrow solitons while leading to rapid spectral broadening. Without the seed, soliton fission will occur if the pump power is large enough; however, the process begins rather suddenly and explosively (like the onset of boiling in a superheated liquid), typically fissioning into multiple solitonic pulses. On the other hand, when the seed is present, a less intense pump (that generates SC with equivalent average power) produces a soliton at an earlier stage of propagation. A quantitative prediction of the frequency shift and timing of the ideal seed requires simultaneous consideration of the broadening due to SPM, walk-off, and the MI frequency shift and gain, which are all interconnected. Thus, the precise frequency shift and timing of the effective seed are not intuitively obvious.

Figure 9B:
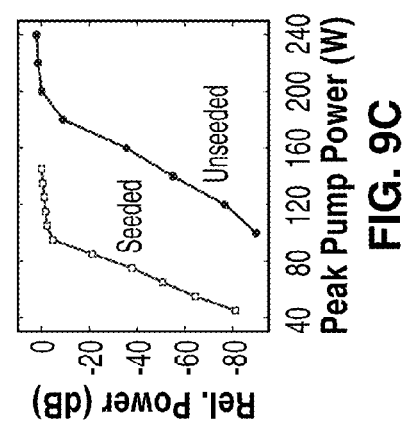
FIGS. 9A through 9C, illustrate modeling of the impact of the weak seed on the SC intensity fluctuations and phase coherence.
Figure 9C:
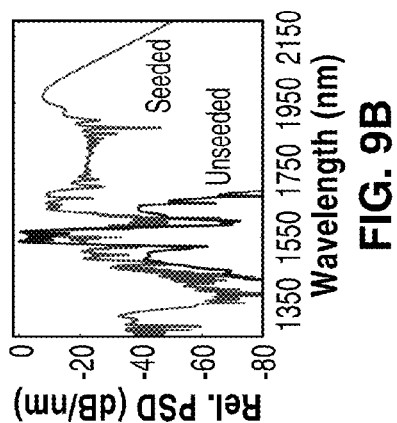
Figure 9A:
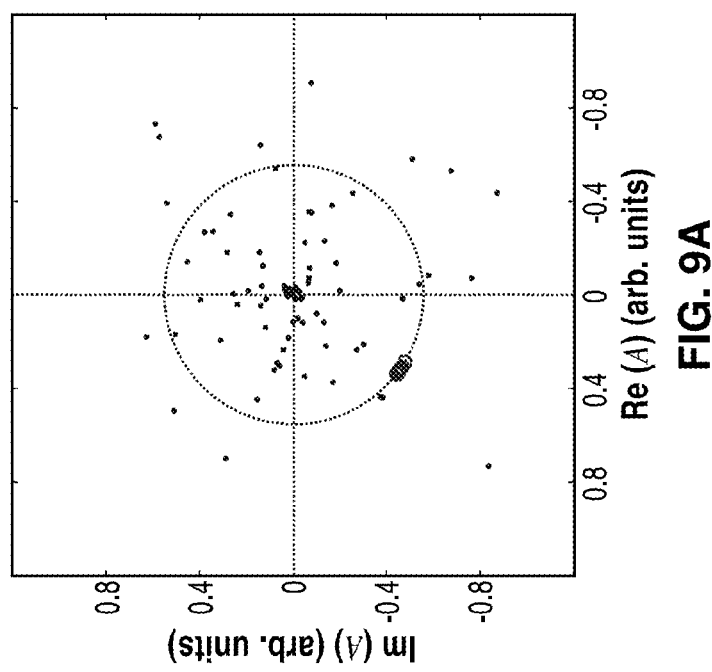

Referring to FIG. 9A through FIG. 9C, the impact of the weak seed on the SC intensity fluctuations and phase coherence were modeled. As mentioned above, noise on the input pulse envelope was included to reproduce the random properties normally attributed to SC radiation. The NLSE is then solved repeatedly for many independent events with and without the weak seed, and spectrally filter the output to collect the light within a red-shifted frequency band.

To illustrate the impact of the seed on both the intensity stability and phase coherence, a complex-plane scatter plot of the electric field SC electric field amplitude A ($\lambda = 1950$ nm, $\Delta\lambda = 5$ nm) from independent events is shown in FIG. 9A. 130 W of pump peak power was seeded (located on narrow section of dotted perimeter, 40 events), and 255 W pump pulses were unseeded (scattered dots, 80 events). The 130 W pump generates negligible SC levels when unseeded. The 255 W pump generates appreciable SC, but the intensity and phase fluctuate tremendously from pulse to pulse. The seeded 130 W pump and the unseeded 255 W pump generate comparable SC average power, but in the seeded case, the fluctuations are nearly eliminated at least ~400 nm from the pump (coefficient of variation for magnitude: ~0.036%; standard deviation for phase angle: ~23 mrad)).

Above threshold, the unseeded scatter fills a large region of the complex plane, whereas, the seeded scatter remains within a tiny region. As the pump power is increased, the sensitivity to seed fluctuations (or noise) heightens; thus, from an experimental perspective, a more stable seed pulse is needed to stabilize SC generation with a higher power pump.

For comparison with the stability enhancement, FIG. 9B shows representative single-shot SC relative power spectral densities with and without the seed at a fixed pump power (130 W pump).

By varying the pump power, the SC threshold (filtered >1680 nm) with and without the seed were also calculated, as shown in FIG. 9C. In the latter case, many trials were averaged for each power level, as the unseeded output is unstable. The SC generation threshold is clearly reduced when the seed is added.

It was also demonstrated experimentally that a coherent seed can be used to enhance the pulse-to-pulse coherence of the supercontinuum. As mentioned above, conventional soliton-fission supercontinuum generation is known to produce spectra that vary from pulse to pulse, and in extreme cases, this variation leads to optical rogue waves. Even when these variations are much less extreme, supercontinuum radiation still lacks pulse-to-pulse coherence.

Pulse-to-pulse coherence represents the ability of two light pulses to interfere with each other. This can be probed by sending two consecutive pulses onto the entrance slit of a spectrometer, with a slight temporal delay between them. The interference then appears as oscillations or "spectral fringes" in the optical spectrum. If consecutive pulses are incoherent, no fringes are observed. This is an established technique for coherence measurement.

Using this technique, the coherence properties of the novel stimulated supercontinuum were measured, as well as conventional, unseeded supercontinuum. FIG. 10A displays the measured interferogram for the seed pulses used to stimulate supercontinuum in our experiments. The fringe pattern proves that the seed possesses pulse-to-pulse coherence.

Next, the coherence of the supercontinuum stimulated by this seed pulse was measured. As shown in FIG. 10B, the coherently seeded supercontinuum displays a clear fringe pattern, wherein the conventional unseeded supercontinuum (solid line) does not. Thus, the seeding mechanism is a coherent process, which transfers the coherence of the seed into the supercontinuum output. As explained above, unseeded (or "spontaneously initiated") supercontinua are incoherent because they are initiated by unavoidable random noise, which is necessarily incoherent. This lack of coherence is currently one of the major drawbacks in many existing supercontinuum sources, and is overcome by the stimulation process. We also find that if a pulse with low coherence is used as the seed, the supercontinuum is essentially incoherent just as it is when spontaneously seeded by noise.

When the pump power is increased, the coherence of the stimulated SC gradually decreases; nevertheless, the seeding produces an absolute increase in the SC. For low pump power levels, the seeded SC has comparable bandwidth to an unseeded SC with much greater pump power, and it has greatly improved coherence.

It is also to be appreciated that high-power pulses are capable of producing coherent SC in bulk media: without MI, the SC is fairly insensitive to noise. In the zero or anomalous dispersion regime, which typically permits larger broadening factors (output to input bandwidth ratio), ultrashort pulses (~10 fs) are also capable of producing coherent SC. For such pulses, the initial bandwidth is great enough to seed MI by the tail of the spectrum. Much larger broadening factors can be realized with narrowband input pulses, indicating large effective nonlinearity, but stability is sacrificed. In contrast, the present invention preserves coherence, while maintaining very large broadening factors.

In an alternative embodiment, specialized dispersion-decreasing fibers and dispersion-managed fibers, as well as soliton pulse compression, can also be used to reduce excess noise with longer pulses. However, the previously described embodiment uniquely offers a means to actively regulate the generation process with a third terminal. Active control may also benefit SC generation with shorter pulses.

To summarize, SC generation is characterized by an extremely sharp power transition threshold. Just below threshold, very little white-light average power is generated, although short, rare bursts of intense white light—optical rogue waves—may be spontaneously emitted due to accidental seeding of MI by random noise. On the other hand, a weak perturbation can cause intense SC pulses to become the norm. In other words, this system exhibits a tipping point: the addition of a weak perturbation strongly increases the SC output by causing an event that is initially exceedingly rare to become the most probable result. The presence of a tipping point allows one to exert significant control over a system with minute effort, and in the present case, offers a means to increase the efficiency of SC generation and stabilize its properties. Because an exceedingly weak field is used to control a much stronger one, this phenomenon may also lead to new applications of SC, such as high-contrast all-optical switching. This effect can also be useful in influencing the dynamics of other nonlinear systems.

A conventional spectrometer generally cannot measure pulse-to-pulse spectral variations; even a wildly fluctuating SC typically appears relatively well behaved on a spectrometer, which measures only time-averaged spectra. The SC spectral variations are measured in real time using wavelength-to-time mapping, which was also used to identify optical rogue waves, as described in Section I. Group-velocity dispersion (GVD) is used to stretch the pulses so that a large number can be captured with a photodetector and a single-shot oscilloscope. In the present measurement, a portion of the SC spectrum ($\lambda \approx 1685$ nm, $\Delta\lambda \approx 10$ nm) is stretched beyond the red edge of the seed pulse using approximately −650 ps/nm of dispersion.

In the calculations of Section II, the generalized nonlinear Schrödinger equation (NLSE) is used as described in Section I. Random noise is included by adding a small randomly-chosen number to the input field envelope at each point in time. Although the precise form of this stochastic perturbation is not critical, a simple, intuitive form has been used with amplitude proportional to the instantaneous field strength. A frequency bandpass filter is then applied to limit the input noise to a bandwidth of ~30 THz around the pump wavelength. For Section II, the second and third order dispersion of the fiber is included used in the experiments, as provided in the manufacturer's test data (Corning HNL ZD 1550).

It should be noted that the experimental parameters used for Section II are different from those used in Section I. At an operating wavelength of 1550 nm, we have: $\beta_2 \approx 1.13 \times 10^{-4}$ ps$^2$/m and $\beta_3 = 6.48 \times 10^{-5}$ ps$^3$/m for the nonlinear fiber used in these experiments. Although inclusion of additional higher-order dispersion terms may facilitate precise calculations, they are not required to corroborate our experimental observations. The nonlinear coefficient and the Raman response parameter are given by: $\gamma = 10.66$ W$^{-1}$km$^{-1}$ and $T_R = 5$ fs. The pulses are 3.7 ps (full width at 1/$e^2$ of maximum intensity) transform-limited pulses.

The overall noise amplitude influences the power threshold for SC generation by soliton fission; the overall noise amplitude was chosen so that the threshold is similar to that observed in the experiment without the weak coherent seed. Since unseeded soliton fission is randomly initiated by noise and can vary significantly from pulse to pulse, many events are typically calculated to determine the average SC at each power level. It has been observed that the qualitative effects described in the manuscript do not depend on a specific choice of the noise perturbation, but the present form was chosen because it is convenient for efficient numerical computation and is physically intuitive.

To model stimulated SC generation, a weak, coherent seed is added to co-propagate with the input pulse in the nonlinear fiber. To calculate the ideal seed frequency shift and timing, a 200 fs (transform-limited) seed pulse is used, and its center frequency and time delay relative to the pump pulse are varied. In each case, the output spectrum is integrated over red-shifted wavelengths (>1680 nm), and the magnitudes are then compared to determine the "sensitive spot" for the seed. It was found that a seed strength of less than 0.0001% of the pump intensity is sufficient to induce appreciable SC generation; however, the weaker the seed, the smaller the sensitive spot becomes.

In the experiment, the seed pulse intensity is roughly 0.01% of the pump, and its temporal duration is comparable to that of the pump; these parameters are used when modelling the stimulated SC threshold and stabilization effect. In order to quantify the intensity and phase fluctuations, the propagation for many independent events is calculated with and without the seed, the output field over a 5 nm interval centered at roughly 1950 nm (~400 nm red-shifted from the pump) is integrated, and the resulting points in the complex plane are plotted. The point scatter then immediately illustrates the spread in magnitude and phase from shot to shot. Without the seed, it was found that the complex amplitude variations are very large, filling a significant region of the plane; whereas, when the correct seed is present, the scatter is compressed to a tiny fraction of the complex space.

In one embodiment, the systems and methods of the present invention may be used to lower the power threshold for supercontinuum generation. Optical supercontinuum generation has a power threshold that depends on the nonlinearity, dispersion, and length of the nonlinear medium. Using conventional techniques, relatively high-power (pump) optical radiation is typically required to generate supercontinuum.

Through the use of a weak seed pulse or continuous-wave beam with the correct frequency and timing, as described in the present invention, the threshold of supercontinuum generation can be dramatically reduced. FIG. 11 shows a device 80 for stimulation of supercontinuum generation with a weak optical seed. As shown in FIG. 11, a weak optical seed 10 with the correct time delay and frequency content is combined with output from a narrow-band optical source 82 at 86 to stimulate supercontinuum generation 18 through nonlinear fiber 16. This method lowers the threshold for supercontinuum generation, and reduces the noise and pulse-to-pulse fluctuations in the supercontinuum output. If a coherent seed is used, the resulting supercontinuum may also be coherent Alternatively, FIG. 12 illustrates a device 90 where a fraction (e.g. 10%) of the supercontinuum 18 output 96 itself is be fed back into the source 82 (with the proper timing) to lower the threshold and reduce the noise and pulse-to-pulse fluctuations in the supercontinuum output. This permits the use of shorter optical path lengths through nonlinear media (e.g., optical fiber) for supercontinuum generation and/or pump sources with lower power. Seeded supercontinuum generation can be applied to create more efficient and more stable white light sources for numerous applications. For a given amount of input power, the conversion of energy to a broad spectrum becomes a more efficient process. Numerous applications exist for supercontinuum white light and a more efficient and stable generation process can enhance these applications. The advantages described here can be used in applications including, but not limited to novel lighting, displays, frequency metrology, spectroscopy, sensing, imaging, and time-stretch analog-to-digital conversion.

In another embodiment, the systems and methods of the present invention may be employed to facilitate noise reduction and pulse-to-pulse stabilization in supercontinuum generation As detailed above, supercontinuum radiation may be initiated by co-propagating a weak seed pulse or continuous-wave beam with the pump or by feeding back a portion of the supercontinuum output back to the source. Supercontinuum generation induced in this way is not seeded by noise, and as a result, is much more stable than the typical 'spontaneous supercontinuum generation' previously used in the art. Such 'spontaneous supercontinuum radiation' generated by the soliton-fission mechanism tends to have a large noise component and to fluctuate significantly from pulse to pulse. On the other hand, supercontinuum radiation induced with a low-noise seed or feedback (as shown in systems 80 and 90 in FIGS. 11 and 12 respectively) may have much lower noise levels and be much more stable from pulse to pulse. Additionally, If stimulated with a coherent seed, the coherence can also be greatly enhanced. As the pump power is increased, the coherence is gradually lost; however, at low pump power (below threshold), the seed results in appreciable SC power with coherence.

There are many applications for stable supercontinuum sources. For example, in time-stretch analog-to-digital conversion, an optical front-end is used to increase the effective sampling rate and analog bandwidth of a back-end electronic digitizer by stretching the electronic signal to be sampled. In this technique, the electronic signal to be sampled by the digitizer must be encoded on stable supercontinuum optical pulses. By applying the methods described in the present invention, a more stable supercontinuum source such as those shown in FIGS. 11 and 12 may be used, which will allow larger stretch factors, increased resolution, and enhanced performance in time-stretch analog-to-digital conversion.

The stable supercontinuum sources shown in FIGS. 11 and 12 may also be applied to wavelength-time spectroscopy—a single-shot spectroscopic technique in which a spectrum is mapped into the time domain with dispersion so that it can be sampled with a digital oscilloscope. In this technique, the absorption spectrum, Raman spectrum, or other type of spectrum of a sample under test is encoded onto a supercontinuum pulse. Since the spectrum of the sample must ultimately be discerned from the envelope of the supercontinuum, a more stable supercontinuum source benefits this technique.

In yet another embodiment, the systems and method of the present invention may be used for producing stable supercontinuum with optoelectronic feedback.

The rogue wave instability permits active control of supercontinuum (SC) generation. This active control can be harnessed in an optoelectronic feedback loop to stabilize the generation process, and produce low noise stimulated SC.

FIG. 13 illustrates schematic diagram of a device 100 for stimulating SC generation with optoelectronic feedback. A pulsed laser 102 is used to pump a nonlinear fiber 16 to produce SC, and the generation is seeded by a portion of the filtered (via second bandpass filter 114) laser output from photodetector 118. The photodetector 118 generates an electrical signal that is used by feedback electronics 116 to produce a feedback signal. The feedback signal is used to drive a modulator 106 (e.g., electro-optic modulator), which controls the amplitude of the signal feeding a separate nonlinear fiber (seed fiber 108). The feedback signal is amplified by first amplifier 104 and the amplified portion is slightly broadened in the seed fiber 108 so that its spectral tail extends just beyond the wavelength needed to stimulate the generation process.

A bandpass filter 110 is used to select the proper portion of the tail to produce a weak seed pulse. In general, the spectrum (amplitude and phase) of the resulting seed pulse will be sensitive to the power input to the seed fiber; this sensitivity can be exploited in a feedback loop. The pump (from second amplifier 109) and seed are delivered to the nonlinear fiber at 112, and a portion of the output stimulated SC is filtered and sent to the photodetector 118 to continue the feedback loop.

The feedback signal in the embodiment described above is generally derived from spectral intensity fluctuations, i.e. the photodetector 118 measures the spectral amplitude fluctuations from pulse to pulse, and the feedback signal acts to maintain the amplitude stability of the simulated SC. In an alternative embodiment 160 illustrated in FIG. 14, an interferometer 162, designed to interfere consecutive pulses, is placed between the output of the nonlinear fiber 16 and second bandpass filter 114 (not shown). In this embodiment, the feedback signal is derived from spectral interference of the stimulated SC, and spectral fringes from the interferometer are recorded. Generally, the fringe pattern will fluctuate from one pulse pair to the next if the stimulated SC does not have pulse-to-pulse coherence. A bandpass filter 114 placed at the output of the interferometer may be used to select a maximum or minimum of one of the spectral fringes. Then, a photodetector 118 placed after the filter 114 will measure a time-varying signal that depends on the pulse-to-pulse coherence: if the stimulated SC has pulse-to-pulse coherence, the signal at the photodetector 118 does not vary from one pulse pair to the next, whereas, it will fluctuate if the SC does not have pulse-to-pulse coherence. Thus, the electronic signal from the photodetector signal can be used to produce a feedback signal to adjust the current of the first amplifier 104, and maintain the stability of the stimulated SC.

In the above embodiments, the feedback signal is used to drive a modulator 106. However, it is contemplated that the feedback signal may be employed in different manners. For example, in the system 170 shown in FIG. 15, the feedback signal could be used to alter the current of the first amplifier 104, without use of a modulator.

In an alternative system 180 shown in FIG. 16, the feedback signal is used to drive a piezoelectric transducer (PZT) 182 instead of the amplifier current. Here, the seed pulse is delivered by an optical fiber that is wound around the PZT 182. Expansion of the PZT 182 would be used to stretch the optical fiber 16 delivering the seed pulse, thereby changing the seed pulse delay and influencing the stimulation process. This system may also be used with the feedback signal derived from pulse interference as shown in FIG. 14.

In the described implementations, the feedback is expected to enhance both the amplitude and phase stability of the stimulated SC, as the two types of stability are generally interconnected. Thus, both approaches have the potential to yield coherent stimulated SC with low intensity noise. Where fibers are used, all of these approaches can benefit from the use of polarization-maintaining fiber to prevent the polarization from drifting.

In yet another embodiment illustrated in FIG. 17, coherent supercontinuum generation may be achieved in system 190 with pump and seed derived from an optical parametric oscillator (OPO) 194. Since the optical frequency spacing between the pump and seed is not extremely large, the OPO 194 is preferably designed so that the signal and idler are nearly degenerate. With an OPO 194, the pump and signal are derived from the same source 192, which facilitates the generation of coherent stimulated SC. Optical feedback may also be utilized with this approach (not shown): a portion of the stimulated SC can be fed back to seed the OPO itself to reduce the noise in the production of the signal and idler. Alternatively, optoelectronic feedback (similar to that shown in FIG. 13) may be implemented to reduce noise. For example, a filter and photodetector can be used at the output to generate an electronic feedback signal as described above. This signal can then be sent to tune a separate laser that is in turn used to seed the OPO.

In another alternative embodiment shown as the system 200 in FIG. 18, the above process may be accomplished with an independent continuous-wave (CW) laser 204 as the seed for pump laser 202. In this embodiment, an optional feedback signal is used to make slight adjustments to the frequency of the CW laser 204 to maintain the stability of the stimulated SC. In addition, other feedback means as described in other configurations detailed in this description may also be used. For example, interference within individual pulses generated by interferometer 162 may be used to generate a feedback signal based on other, established interferometric techniques. This approach may also be used for the purpose of phase locking one or more independent continuous-wave (CW) lasers 204 to a mode-locked laser 202. It is also appreciated that feedback may not be needed in all configurations. Without feedback, the seed may be less coherent/stable, but may provide a simpler construct for applications that may not require such stability.

In a further embodiment, coherent supercontinuum generation may be produced by multiple mode-locked lasers. Referring to the apparatus 120 shown in FIG. 19, independent active or hybrid mode-locked lasers 122 and 126 are used to produce the pump and seed pulses for stimulated SC generation. In this embodiment, the two lasers 122, 126 operate at different wavelengths to serve as the pump and seed. The independent lasers are driven by a single low-noise RF oscillator 124 to ensure that they are synchronized and mutually coherent. Since the lasers are electronically driven by the same radio frequency source, they have excellent relative stability, which is important for producing stable stimulated SC.

Typically, an actively mode-locked laser will produce fairly long pulses for a low repetition rate (~100 MHz). To obtain shorter pulses in this situation, one can employ a hybrid mode-locking approach, a known type of laser that has elements of both active and passive mode-locking.

One alternative is to use hybrid mode-locking for the pump 122 to obtain shorter pulses (~picoseconds) with ~100 MHz repetition rate, with an actively mode-locked laser for the seed 126. In this case, the seed pulses will be much longer for a matching repetition rate; however, longer pulses can be of benefit as the seed 126 because they make synchronization with the pump pulses simpler. Longer pulses for the pump 122 are less desirable because the peak power can become too low to produce supercontinuum. On the other hand, the seed pulses need not have high peak power, so longer pulses can be used in this context.

An optoelectronic oscillator (OEO) may also be used for the pump and/or seed lasers (not shown). In this context, there is no independent RF oscillator, as the OEO is self-referenced. The OEO forms the master oscillator producing pump pulses, and a portion of its RF signal is used to drive a second (slave) active or hybrid mode-locked laser at the proper wavelength, which serves as the seed. This situation can be reversed so that the master laser produces the seed pulses and the pump laser is the slave, or a third laser can be used as the master oscillator with both pump and seed lasers as slaves.

Since the lasers are electronically driven by the same radio frequency source, they have excellent relative stability, which is crucial for producing stable stimulated SC.

The supercontinuum seeding methods of the present invention also provide an efficient means to transfer the energy contained in the pump pulse into a soliton wavepacket. Since solitons travel without spreading due to a balance between dispersion and nonlinearity, they have application in long distance communication. If the seed is stable and coherent, the soliton pulses generated from a train of starting pump pulses will also be stable and coherent. The techniques described above for producing stable stimulated supercontinuum can also be applied for this purpose.

The Methods of the present invention may also be used in an optical switch. FIGS. 20 and 21 show a schematic diagram of device 140 using stimulated supercontinuum as an optical switch or three-terminal device 150. As previously described above, a weak seed field can have a dramatic affect on a strong pump field if the seed has the correct frequency shift and timing. This effect can be exploited to make a high-contrast switch 150 as shown in FIG. 21. When the seed is correctly synchronized and has the right frequency, a significant portion of the pump power is transferred to red wavelengths. When it the seed is not within the correct time-frequency window, the pump is unaffected. If a redpass or bluepass filter is added to the output, power is transmitted with the correct seed and power is not transmitted otherwise. On the other hand, using a bandpass filter centered in the vicinity of the pump wavelength, more power is transmitted without the correct seed. Thus, a seed field together with the nonlinear medium 16 act as an optically-controlled gate for the pump field. If a bandpass filter 146 or other filter that blocks power around the pump wavelength is placed at the output of the nonlinear fiber 16, output light is passed only if the control signal (seed 144) is "on". Thus, a powerful field can be turned "off" or "on" by removing or applying the weak control field. As such, this constitutes a three-terminal device 150 as shown in FIG. 21, wherein input 152 is modified by the control signal 154 to switch on or off the output 158. This acts as an optical counterpart of the transistor in electronics.

The optical rogue wave of the present invention may also be used to create a sequence of pulses with random intensity. If combined with a gate or a process that is only sensitive to pulses above some threshold, it can also be used to create a sequence of pulses separated by random intervals. Random pulse sequences can be useful, for example, in testing the response of optical and electronic devices to non-repetitive signals, as many devices respond differently to non-repetitive signals than they do to repetitive ones.

In another embodiment, coherent supercontinuum generation may be combined with frequency filtering. Aside from the active techniques described above for coherent SC generation, frequency filtering of noise can also be utilized to reduce the impact of noise on SC generation. In particular, if the nonlinear fiber is split up into short segments, a frequency filter designed to block the modulation instability (MI) frequency band can be inserted between each segment. This allows the central portion of the spectrum to broaden from self-phase modulation (SPM), while the MI noise is removed at each point. Another way to accomplish this is to use a nonlinear fiber with an internal Bragg grating designed to reject signals at the MI-amplified noise. Then the pulse can be broadened due to SPM with less impact from instability. Once the spectrum has been broadened up to the cut-off point of the filter, some additional broadening can be done in a standard nonlinear fiber without filtering. If this additional broadening is not extreme, the noise impact on the SC need not be significant.

In yet another embodiment, stimulated supercontinuum generation by a weak seed can also be applied to spectroscopy and sensing for detection of weak signals. In particular, it can be used to indicate the presence of a weak signal at the seed wavelength, which could be emitted from rarefied or dilute chemical species.

FIG. 22 shows a schematic diagram for a device 150 using stimulated supercontinuum as a binary detector of a weak signal. As the weak signal has a dramatic impact on the supercontinuum generation process, its presence can be identified using a photodetector 162 with a bandpass filter 160 (or long-pass filter or other filter that blocks power along the pump wavelength) at the output of the nonlinear fiber 16. Thus, the photodetector 162 measures optical power only if SC generation has been accelerated by the spectroscopic signature of the sample 154. An additional bandpass filter 158 may be used to select the signature portion of the sample's emission spectrum. The pump wavelength and fiber 16 properties can be chosen such that the spectroscopic signal from the sample is appropriate to seed SC generation. Power is only passed by this filter if stimulated SC has been produced. This system acts as a sensitive binary detector as it indicates the presence or absence of the sample.

The generation of optical rogue waves may also be applied to generation of extreme water waves in hydrodynamics with minimal effort. As described above, optical rogue waves can develop due to noise-seeded instabilities in a nonlinear medium. Furthermore, strong red-shifted optical events can be purposely created by injecting a tiny amount of noise or a coherent field with the proper frequency content and timing into a sub-threshold supercontinuum process. Similarly, in hydrodynamics, rogue waves develop due to nonlinear modulation instability from seemingly innocuous initial conditions. By injecting a weak phase or amplitude perturbation with the correct properties, an anomalously strong water wave can be generated with minimal effort or addition of energy. In this case, a mechanical device, e.g. paddle or similar means to generate a movement in water, is used to generate the seed at the right frequency and timing.

The methods above used for generating optical rogue waves may also be used for prediction of extreme water waves in hydrodynamics. Similar to optical rogue waves, hydrodynamic rogue waves may develop when the initial conditions of a water wave contain noise that efficiently seeds modulation instability. By examining water waves for noise within the sensitive frequency and timing window (e.g. via sensors placed at spaced apart locations in the ocean), the development of a rogue wave can be predicted.

Furthermore, the above methods may be used to collapse extreme water waves in hydrodynamics. As described above, optical rogue waves have a finite lifetime before they suddenly collapse. This collapse is caused by nonlinear instabilities such as Raman gain. For example, stimulated Raman scattering can transfer power from the rogue soliton to the downshifted frequencies, eventually perturbing it beyond its critical survival threshold. Since this process is seeded by noise, the collapse is seemingly unpredictable. However, by perturbing the field appropriately, this collapse process can be initiated in a controllable fashion. Similarly it is known that in the ocean, rogue waves have finite, unpredictable lifetimes. By creating the proper perturbation in the water (i.e., a perturbation with the correct frequency content and timing), this process can be accelerated and controlled to prevent rogue waves.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for stimulating an optical rogue wave, comprising:
   generating an input pulse into a nonlinear optical medium; and
   perturbing the input pulse by directing a narrow-band seed radiation into the input pulse;
   wherein the seed radiation has a frequency and timing with respect to the input pulse to stimulate broadband radiation within the nonlinear optical medium.

2. A method as recited in claim 1, wherein the broadband radiation comprises supercontinuum radiation.

3. A method as recited in claim 2:
   wherein the input pulse, without said stimulation, is insufficient to generate supercontinuum radiation; and
   wherein the characteristics of the seed radiation stimulate the input pulse to generate supercontinuum radiation.

4. A method as recited in claim 2, wherein the characteristics of the seed radiation enhance the coherence of the supercontinuum radiation.

5. A method as recited in claim 2, wherein the broadband radiation comprises one or more solitons.

6. A method as recited in claim 2, wherein the seed pulse comprises a weak seed pulse or continuous-wave beam with respect to the input pulse.

7. A method as recited in claim 2, wherein the seed pulse comprises a coherent seed pulse.

8. A method as recited in claim 1, wherein stimulating broadband radiation comprises inducing one or more gain processes within the nonlinear optical medium.

9. A method as recited in claim 8, wherein the one or more gain processes comprises modulation instability.

10. A method as recited in claim 8, wherein the one or more gain processes comprises Raman scattering.

11. A method as recited in claim 2, wherein the input pulse and seed radiation are generated by an optical parametric oscillator for stimulating the supercontinuum radiation.

12. A method as recited in claim 8, further comprising:
    detecting changes in optical power as a function of the modulation instability being seeded by optical noise.

13. An apparatus for generating an optical rogue wave, comprising:
    a nonlinear optical medium;
    a light source coupled to the nonlinear optical medium;
    the light source configured to generate an input pulse into a nonlinear optical medium; and
    means for perturbing the input pulse by directing a narrow-band seed radiation into the input pulse;
    wherein the seed radiation has a frequency and timing with respect to the input pulse to stimulate broadband radiation by inducing one or more gain processes within the nonlinear optical medium.

14. An apparatus as recited in claim 13, wherein the broadband radiation comprises supercontinuum radiation.

15. An apparatus as recited in claim 14:
    wherein the input pulse, without said stimulation, is insufficient to generate supercontinuum radiation; and
    wherein the characteristics of the seed radiation stimulate the input pulse to generate supercontinuum radiation.

16. An apparatus as recited in claim 14, wherein the characteristics of the seed radiation enhance the coherence of the supercontinuum radiation.

17. An apparatus as recited in claim 14, wherein the broadband radiation comprises one or more solitons.

18. An apparatus as recited in claim 14, wherein the seed pulse comprises a weak seed pulse or continuous-wave beam with respect to the input pulse.

19. An apparatus as recited in claim 14, wherein the seed pulse comprises a coherent seed pulse.

20. An apparatus as recited in claim 13, wherein the one or more gain processes comprises modulation instability.

21. An apparatus as recited in claim 13, wherein the one or more gain processes comprises Raman scattering.

22. An apparatus as recited in claim 13, wherein said means comprises an optical parametric oscillator configured for generating the input pulse and seed radiation.

23. An apparatus as recited in claim 12:
    wherein said means comprises an additional light source coupled to the input;
    wherein the apparatus is sensitive to changes in the output signal arising from supercontinuum generation being accelerated by the additional light source.

24. An apparatus as recited in claim 23, further comprising:
    a filter disposed between the detector and the nonlinear optical medium to select wavelengths of light shifted from the laser source.

25. An apparatus as recited in claim 23, further comprising:
    a dispersive element configured to allow an output spectrum of the output signal to be mapped into the time domain to allow for the output spectrum to be measured with an oscilloscope.

26. An apparatus as recited in claim 13, wherein said means comprises a pair of synchronized mode-locked lasers configured for generating the input pulse and seed radiation.

27. A method for generating a rogue wave, comprising:
    providing an input pulse;
    perturbing the input pulse by adding a weak phase or amplitude seed perturbation;
    wherein the frequency and timing of the seed perturbation is configured to generate a supercontinuum energy in the form of a rogue wave.

28. A method as recited in claim 27, wherein the supercontinuum energy comprises a hydrodynamic wave.

* * * * *